(12) United States Patent
Singh et al.

(10) Patent No.: US 12,350,622 B2
(45) Date of Patent: Jul. 8, 2025

(54) SYSTEMS AND PROCESS FOR CARBON CAPTURE AND CONVERSION

(71) Applicant: THE BOARD OF TRUSTEES OF THE UNIVERSITY OF ILLINOIS, Urbana, IL (US)

(72) Inventors: Meenesh R. Singh, Chicago, IL (US); Aditya Prajapati, Chicago, IL (US); Rohan Sartape, Chicago, IL (US)

(73) Assignee: The Board of Trustees of the University of Illinois, Urbana, IL (US)

( * ) Notice: Subject to any disclaimer, the term of this patent is extended or adjusted under 35 U.S.C. 154(b) by 0 days.

(21) Appl. No.: 18/016,218

(22) PCT Filed: Jul. 14, 2021

(86) PCT No.: PCT/US2021/041677
§ 371 (c)(1),
(2) Date: Jan. 13, 2023

(87) PCT Pub. No.: WO2022/015882
PCT Pub. Date: Jan. 20, 2022

(65) Prior Publication Data
US 2023/0256380 A1    Aug. 17, 2023

Related U.S. Application Data

(60) Provisional application No. 63/210,865, filed on Jun. 15, 2021, provisional application No. 63/051,785, filed on Jul. 14, 2020.

(51) Int. Cl.
*B01D 53/14* (2006.01)
*B01D 53/22* (2006.01)
(Continued)

(52) U.S. Cl.
CPC ..... *B01D 53/1475* (2013.01); *B01D 53/1493* (2013.01); *B01D 53/229* (2013.01);
(Continued)

(58) Field of Classification Search
None
See application file for complete search history.

(56) References Cited

U.S. PATENT DOCUMENTS 8,349,281 B2    1/2013  Toulhoat et al.
8,791,354 B2    7/2014  Iwasaki
(Continued)

FOREIGN PATENT DOCUMENTS

CN    108625040 A  * 10/2018  ............ D01D 5/003
JP    2005346963 A    12/2005
(Continued)

OTHER PUBLICATIONS

Machine translation of Gao et al, CN-108625040-A (Year: 2018).*
(Continued)

*Primary Examiner* — Wojciech Haske
(74) *Attorney, Agent, or Firm* — MARSHALL, GERSTEIN & BORUN LLP

(57) ABSTRACT

An active $CO_2$ capture unit for capturing $CO_2$ from a dilute source of $CO_2$ input gas can include an inlet through which an input gas is introduced into the unit and a non-aqueous region comprising a non-aqueous $CO_2$ binding organic liquid containing $OH^-$ arranged to be in contact with the input gas to chemisorb $CO_2$ from the input gas and convert the chemisorbed $CO_2$ into $HCO_3^-$ by reacting with $OH^-$. The unit also includes an aqueous region arranged downstream of the non-aqueous region, wherein at an aqueous region interface, the $HCO_3^-$ interacts with $H_2O$ and decomposes to $CO_2$ and $CO_3^{2-}$. An anion exchange membrane is disposed between the non-aqueous region and the aqueous region to
(Continued)

facilitate $HCO_3^-$ diffusion and migration from the non-aqueous region to the aqueous region. A captured $CO_2$ outlet is disposed downstream of the aqueous region.

23 Claims, 28 Drawing Sheets

(51) Int. Cl.
| | | |
|---|---|---|
| *B01D 53/62* | (2006.01) | |
| *B01D 53/78* | (2006.01) | |
| *B01D 53/86* | (2006.01) | |
| *B01D 71/28* | (2006.01) | |
| *C25B 1/04* | (2021.01) | |
| *C25B 1/23* | (2021.01) | |
| *C25B 3/03* | (2021.01) | |
| *C25B 3/07* | (2021.01) | |
| *C25B 3/26* | (2021.01) | |
| *C25B 9/19* | (2021.01) | |
| *C25B 9/70* | (2021.01) | |
| *C25B 11/03* | (2021.01) | |
| *C25B 11/052* | (2021.01) | |
| *C25B 11/075* | (2021.01) | |
| *C25B 15/08* | (2006.01) | |

(52) U.S. Cl.
CPC .............. *B01D 53/62* (2013.01); *B01D 53/78* (2013.01); *B01D 53/8671* (2013.01); *B01D 71/281* (2022.08); *C25B 1/04* (2013.01); *C25B 1/23* (2021.01); *C25B 3/03* (2021.01); *C25B 3/07* (2021.01); *C25B 3/26* (2021.01); *C25B 9/19* (2021.01); *C25B 9/70* (2021.01); *C25B 11/03* (2013.01); *C25B 11/052* (2021.01); *C25B 11/075* (2021.01); *B01D 2053/224* (2013.01); *B01D 2251/604* (2013.01); *B01D 2252/30* (2013.01); *B01D 2255/20761* (2013.01); *B01D 2257/504* (2013.01); *B01D 2258/0283* (2013.01); *B01D 2258/06* (2013.01)

(56) References Cited

U.S. PATENT DOCUMENTS

| | | | |
|---|---|---|---|
| 2005/0129598 A1 | 6/2005 | Chinn et al. | |
| 2019/0044158 A1* | 2/2019 | Wang | H01M 4/368 |
| 2020/0131649 A1* | 4/2020 | Krause | C25B 11/031 |

FOREIGN PATENT DOCUMENTS

| | | |
|---|---|---|
| JP | 2007515283 A | 6/2007 |
| JP | 2013525088 A | 6/2013 |
| JP | 2014520959 A | 8/2014 |
| JP | 2016010760 A | 1/2016 |
| KR | 20050017649 A | 2/2005 |
| KR | 20130015355 A | 2/2013 |
| WO | WO-2011/120021 A1 | 9/2011 |
| WO | WO-2013/006710 A2 | 1/2013 |
| WO | WO-2019/172750 A1 | 9/2019 |
| WO | WO-2019/204938 A1 | 10/2019 |
| WO | WO-2020/109295 A1 | 6/2020 |

OTHER PUBLICATIONS

International Search Report and Written Opinion for Corresponding International Application No. PCT/US2021/041677 mailing date Oct. 27, 2021.

* cited by examiner

Experimental Setup to evaluate carbon capture efficiency of AEMs in the presence of moisture gradients

SYSTEMS AND PROCESS FOR CARBON CAPTURE AND CONVERSION

CROSS REFERENCE TO RELATED APPLICATIONS

This application is the U.S. National phase of International Patent Application No. PCT/US2021/041677 filed Jul. 14, 2021, which in turn claims the priority benefit of U.S. Provisional Application 63/210,865 filed on Jun. 15, 2021, and U.S. Provisional Application 63/051,785 filed on Jul. 14, 2020, the respective disclosures of which are hereby incorporated by reference in their entireties.

BACKGROUND

Field of the Disclosure

The disclosure relates to systems and processes for capture and conversion of $CO_2$, and more particularly for capture and conversion of $CO_2$ from sources like power plants and chemical industries and even from the air generally, which can advantageously reduce the anthropogenic carbon footprint.

BRIEF DESCRIPTION OF RELATED TECHNOLOGY

Currently, about 85% of the world energy consumption is supplied from burning fossil fuels, such as petroleum, natural gas, and coal. Despite the low cost and high energy density of fossil fuels, the use of fossil fuels is unavoidably coupled to the release of many undesirable compounds, such as carbon dioxide ($CO_2$), which can cause a number of adverse effects on the environment, including ocean acidification, climate change and the like.

Conventional $CO_2$ capture technologies include absorption, cryogenic distillation, adsorption, and membrane separation. Liquid absorbents such as monoethanolamine (MEA), diethanolamine, and aqueous hydroxide solutions are widely employed in industry to capture $CO_2$ selectively. The amine-based processes suffer from solvent losses due to evaporation and high viscosity upon $CO_2$ absorption. The strong binding of $CO_2$ with the amine functionality necessitates high temperatures, which negatively impacts the energy efficiency of the process. In the case of aqueous hydroxide solutions, the conversion of $HCO_3^-$ to $CO_3^{2-}$ limits the $CO_2$ capture capacity and results in high energy consumption for releasing $CO_2$. Another concern is water loss during the causticization-calcination process for regenerating $Ca(OH)_2$ for the hydroxide-based approaches. Cryogenic distillation is another established technology that cools $CO_2$ to below sublimation temperatures (−100 to −135° C.) to separate it from lighter gasses. The temperature requirements of this process make it a highly energy-intensive process. Solid adsorbents like metal-organic frameworks (MOFs), CaO, and alkali metal carbonates exhibit >85% adsorption efficiency and operate as a membrane that separates the $CO_2$ from a mixture of gasses in the feed either by size exclusion or by relative electrostatic attraction in a single-pass operation. All present $CO_2$ capture technologies require regeneration of the $CO_2$ capture medium, which not only makes the process energy-intensive but also discontinuous as no $CO_2$ is captured during this regeneration step. Process modifications like chemical looping and the use of dual fluidized bed adsorbers have attempted to circumvent this challenge but only at the expense of higher energy consumption.

It has been predicted that over the coming few decades (2010-2060), the cumulative amount of atmospheric $CO_2$ will increase, up to approximately 496 gigatons, due to fossil fuel combustion in the existing infrastructure. Thus, there is an urgent need for both alternative energy sources and improved control of the rate of $CO_2$ emissions. However, due to high global energy demands, there is no immediate alternative to replace or substantially reduce production of fossil fuels. The problem is further exacerbated by the low cost of fossil fuels. Fortunately, research into the electrocatalytic reduction of $CO_2$ has produced a remarkable number of advances over the past few years, yet there is still no known solution that can harvest $CO_2$ directly from the air and other point sources and convert collected $CO_2$ emissions into value-added chemicals.

SUMMARY

Water-driven $CO_2$ capture techniques are attractive for their low energy penalty. Hydrate-based $CO_2$ separation is a water-driven technology where $CO_2$ forms hydrates with water or water-miscible solvents under high pressure and can be separated from a feed with a mixture of gasses. Moisture swing technologies capture $CO_2$ directly from the air where a quaternary amine ion-exchange resin supported on a polymeric backbone acting as an anion-exchange membrane absorbs $CO_2$ in a water-deprived (dry) environment in the form of bicarbonates and carbonates, and releases it at $CO_2$ in a wet environment by virtue of the carbonate-bicarbonate equilibrium. This mechanism can be exploited by keeping a constant water-deprived environment on one side of the anion-exchange membrane with a constant supply of $CO_2$ and a wet environment on the other side, thereby establishing a gradient of concentration of water across the anion-exchange membrane.

Disclosed herein is an active $CO_2$ capture unit that utilize a $CO_2$ binding organic liquid present in a non-aqueous region of the unit to chemisorb $CO_2$ from an input gas and convert it to $HCO_3^-$. The unit includes an anion exchange membrane arranged at an interface between the non-aqueous region and an aqueous region to facilitate transfer of the $HCO_3^-$ to the aqueous region where the $HCO_3^-$ interacts with $H_2O$ and is decomposed to $CO_2$ and $CO_3^{2-}$.

Also disclosed herein is a system for $CO_2$ capture and conversion of the captured $CO_2$ into one or more of $C_3H_6$, $CH_4$, $C_2H_4$, $C_2H_5OH$, $CH_3OH$, CO, $H_2$ and $CH_3COOH$. Byproducts of the system can include syngas (CO and $H_2$) and $O_2$. Systems of the disclosure can be fully integrated systems that combine $CO_2$ capture and conversion into a single process. The process can be sustainable and energy-efficient.

In accordance with the principles of the present disclosure an automated and fully integrated electrochemical system that combines $CO_2$ capture and conversion into a single, sustainable and energy-efficient process that can capture $CO_2$ emissions from ambient air and other point sources and convert the emissions to produce syngas (CO and $H_2$) with tunable compositions at ambient conditions. Syngas can be used as a feedstock for long-chain hydrocarbon production, such as via Fischer-Tropsch process or the like.

Exemplary embodiments including an integrated electrocatalytic membrane configured for efficient capturing of $CO_2$ from one or more dilute sources and/or gases at ambient conditions to form a product are set forth. Membranes can be constructed such that supported ionic liquid(s) can include one or more imidazole-based liquids, phosphonium-based liquids, or an anion-exchange membrane or resin. The product can be further defined by at least one of $C_2H_4$, $C_2H_5OH$, $C_3H_6$, CO, $H_2$, $CH_3OH$, and $CH_3COOH$. In certain exemplary embodiments, capture and conversion of $CO_2$ in the membrane can both occur within the integrated electrocatalytic membrane system. The one or more dilute sources/gases can include flue gas.

DETAILED DESCRIPTION

A moisture-gradient process for $CO_2$ capture and units for performing such process are disclosed herein. Further, processes for capture and reduction of $CO_2$ into a desired product and systems for performing the same are also disclosed herein. Such systems can be integrated systems for performing both the capture and reduction processes. Capture units of the disclosure can advantageously capture $CO_2$ from dilute sources, such as flue gas, other industrial gases, and air, and release substantially pure $CO_2$. In systems of the disclosure, the released $CO_2$ can be reduced with by-products produced during the process being recycled into the process to allow for a continuous or substantially continuous process. Intermittent processes for capture and reduction are also contemplated herein.

Figure 1:
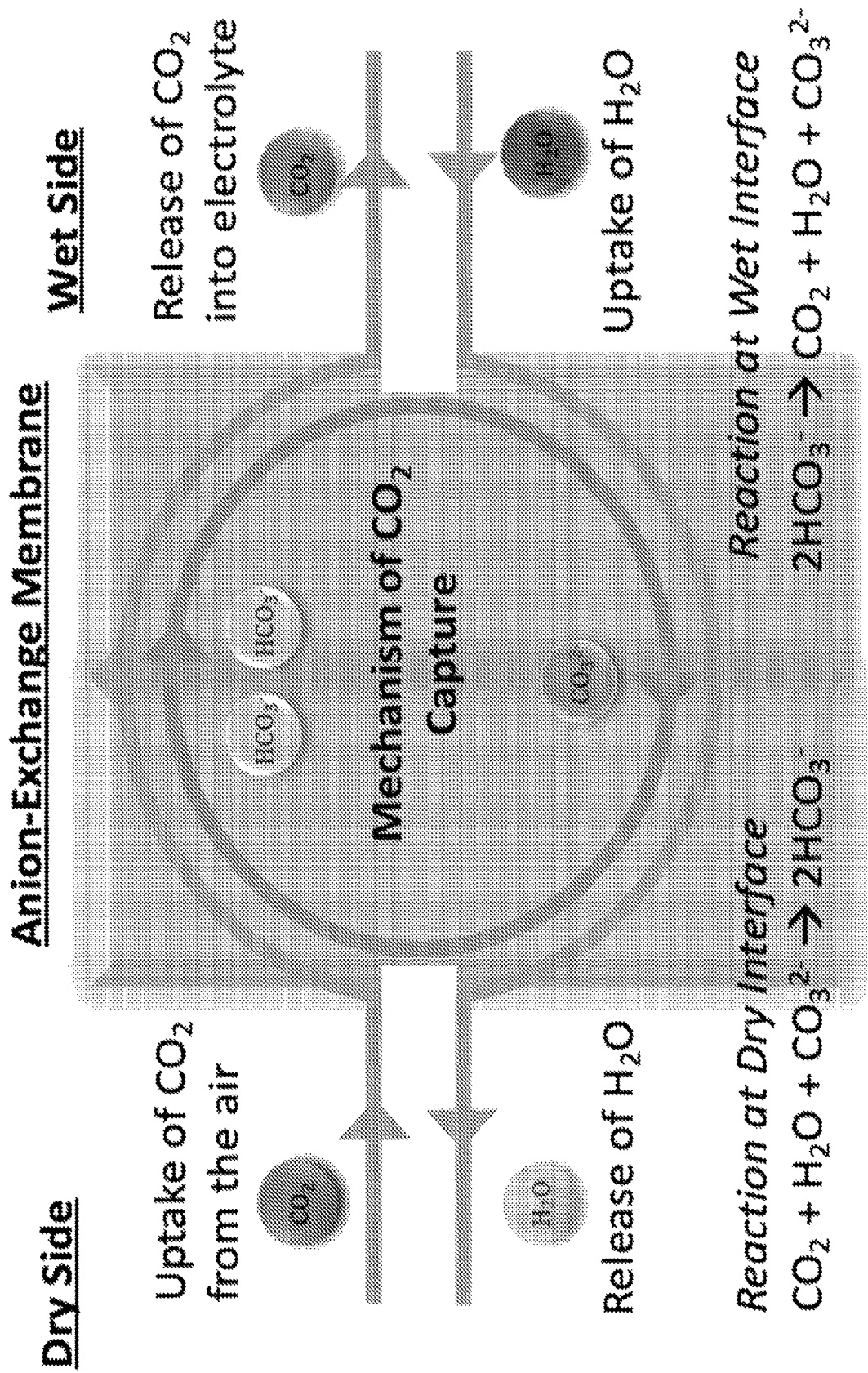
FIG. 1 is a schematic illustration of a mechanism of $CO_2$ capture and transport using a moisture-gradient process in accordance with the disclosure.

Referring to FIG. 1, $CO_2$ capture processes of the disclosure can be driven by the reaction $2HCO_3^- \leftrightarrows CO_2 + CO_3^{2-} + H_2O$ where $H_2O$ autocatalyze this reaction. Without intending to be bound by theory, it is believed that the reaction mechanism represents the autocatalytic $HCO_3^-$ decomposition:

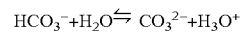

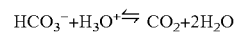

According to Le Chatelier's principle, increasing the concentration of $HCO_3^-$ in the membrane will increase the concentration of $CO_2$ at the aqueous interface (wet-interface), where relative humidity (RH) of water is maintained at 100%. The higher concentration of $HCO_3^-$ in the membrane is obtained by reducing the $H_2O$ concentration at the non-aqueous (dry) interface, such that the $H_2O$ bridging the $CO_2$ and $CO_3^{2-}$ molecules at the dry interface can split to yield two molecules of $HCO_3^-$.

Figure 2:
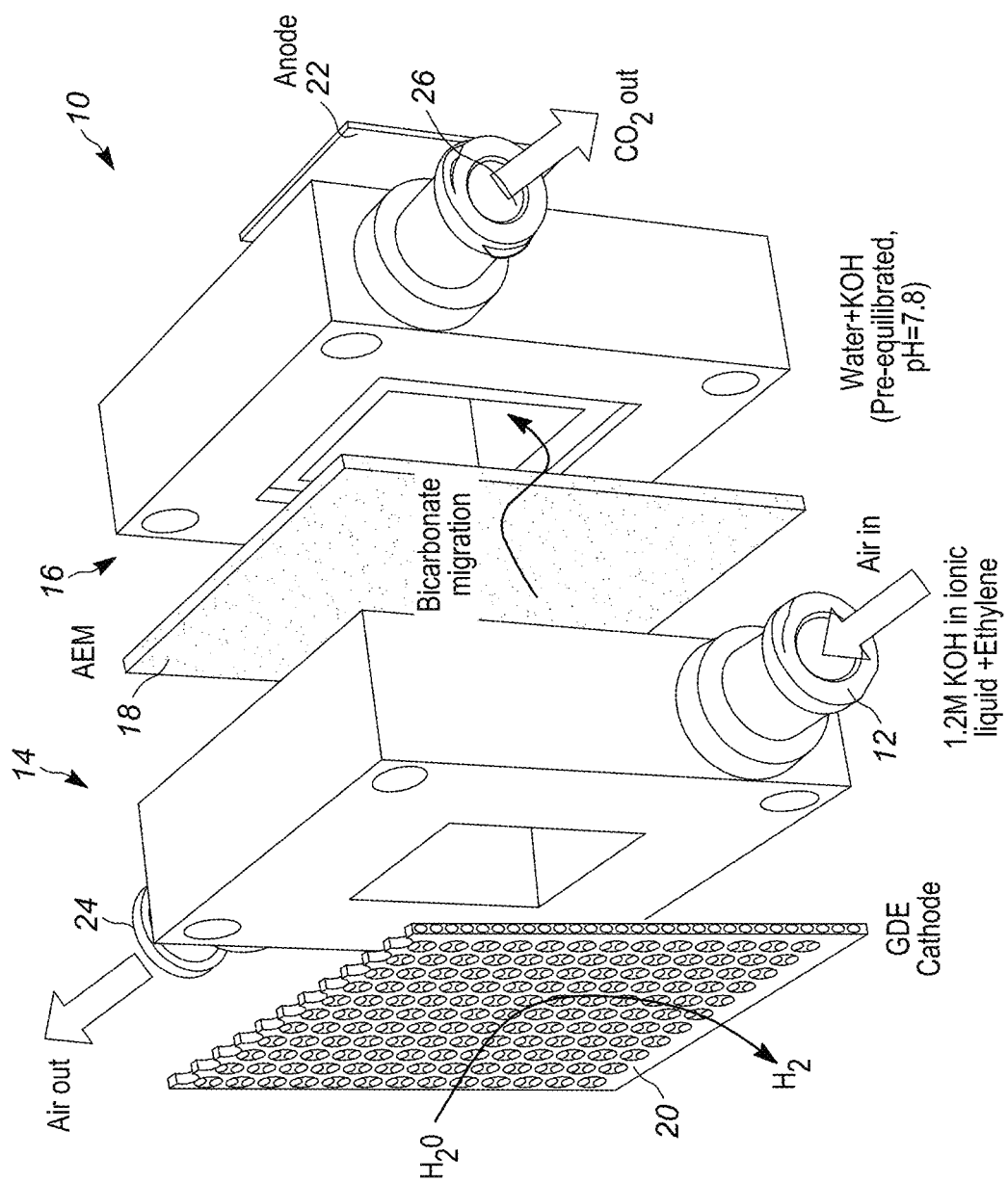
FIG. 2 is a schematic illustration of a $CO_2$ capture unit in accordance with the disclosure.

Referring to FIG. 2, active $CO_2$ capture devices 10 of the disclosure can include an input gas inlet 12, which introduces the input gas into a non-aqueous region 14 of the capture unit 10 for capture of $CO_2$ from the input gas. The capture unit further includes an aqueous region 16 downstream of the non-aqueous region 14, with an anion exchange membrane 18 disposed between the aqueous 16 and non-aqueous regions 14, such that a gradient of moisture is generated across the anion exchange membrane 18. The unit 10 can alternatively operate as a membrane-electrode unit in which a cathode 20 is provided in the non-aqueous region 14 for decomposition of $H_2O$ to provide a source of $OH^-$ to the non-aqueous region 14. In such a unit, $H_2O$ from the aqueous region is reduced on the cathode to produce $H_2$ gas and OH. The $H_2$ gas bubbles out and the $OH^-$ reacts with the $CO_2$ in the input steam to produce $HCO_3^-$. The continuous production of $OH^-$ ensure continuous capture of $CO_2$ as $HCO_3^-$.

Capture units 10 of the disclosure can further include a cathode 20 arranged in or upstream of the non-aqueous region 14 whether for operation as a membrane-electrode unit or for use with capture units having $CO_2$ binding organic liquids in the non-aqueous region. The cathode 20 can function to reduce $H_2O$ to $H_2$ gas and $OH^-$ which can be a source for the binding of $CO_2$ and conversion to $HCO_3^-$ in the non-aqueous region n14. An $H_2$ outlet 28 can be arranged such that the $H_2$ gas bubbling out from the reduction of $H_2O$ is vented from the unit 10.

Capture units 10 of the disclosure can further include an anode 22 arranged downstream of the aqueous region. In capture units 10 of the disclosure having cathodes 20 and anodes 22, the aqueous region 16 can include an aqueous electrolyte and an electric field can be applied within the capture unit to facilitate migration and diffusion of the $HCO_3^-$ from the non-aqueous region 14 to the aqueous region 16. In embodiments, the electric field can be generated and applied within the capture unit.

Figure 3:
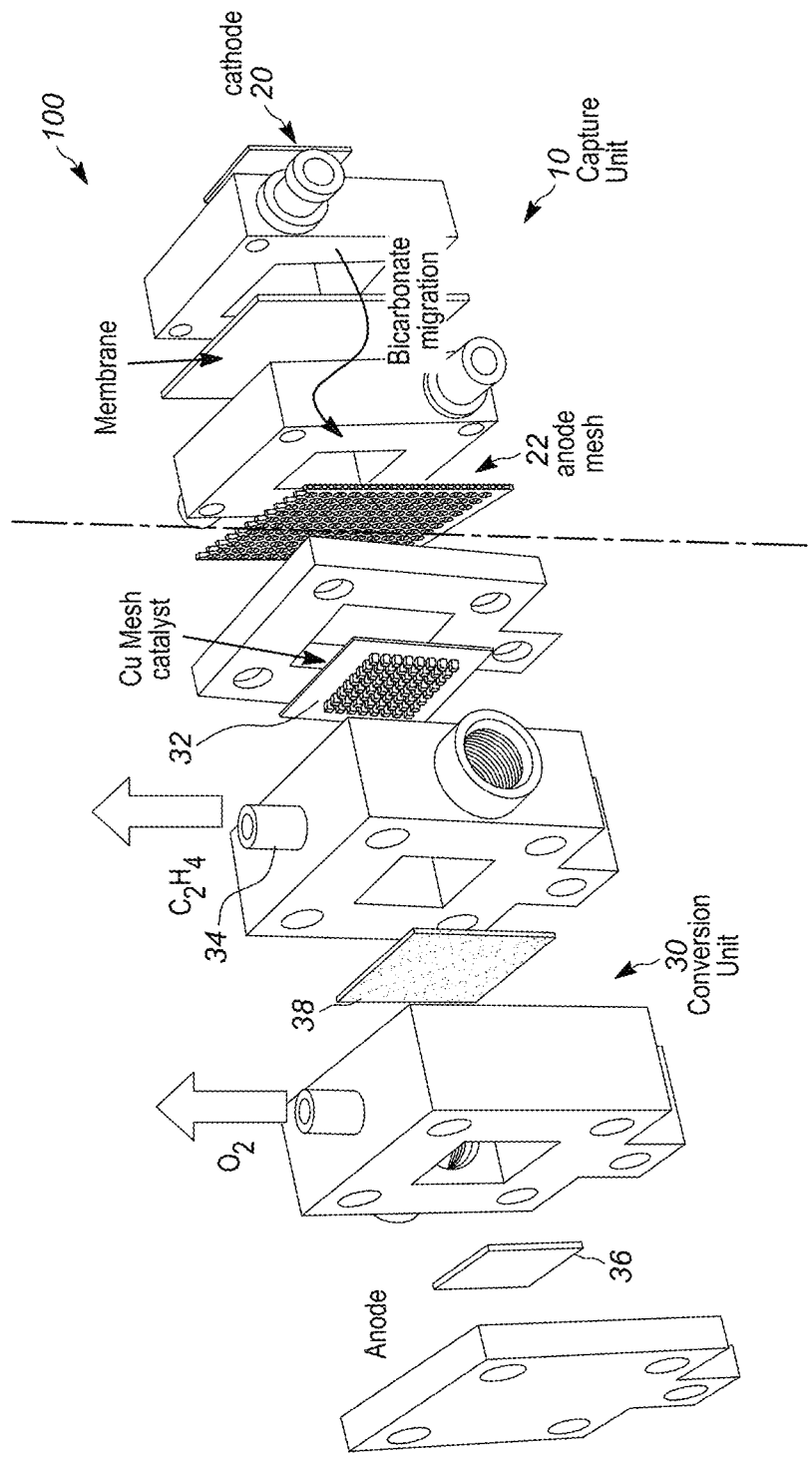
FIG. 3 is a schematic illustration of a system for $CO_2$ capture and reduction in accordance with the disclosure.

Either or both of the anode 22 and cathode 20 can be planar and/or porous. Referring to FIG. 3, in systems 100 of the disclosure having capture units 10 and reduction units 30, the cathode 20 can be arranged upstream of the capture unit and the anode 22 can be arranged downstream of the reduction unit 30, as described in detail below.

The non-aqueous region 14 can include a $CO_2$ binding organic liquid containing $OH^-$ which is arranged to be in contact with the input gas to chemisorb $CO_2$ from the input gas and convert the chemisorbed $CO_2$ into $HCO_3^-$ by reaching with the $OH^-$ and/or a source for $OH^-$. The $CO_2$ binding organic liquid can be for example an ionic liquid. The ionic liquid can be imidazolium- or phosphonium-based. For example, the ionic liquid can be one or more of choline hydroxide, tetrabutylphosphonium methanesulfonate, and 1-Butyl-3-methylimidazolium hexafluorophosphate.

The hydroxide ion source can be, for example, an alkali metal hydroxide. The hydroxide ion source can be dissolved in the $CO_2$ binding organic liquid. For example, the hydroxide ion source can be KOH.

The non-aqueous region 14 can further include a non-aqueous polar organic solvent. The non-aqueous polar solvent can be one or more of alcohols, organic amidine bases, or guanidine bases. The amidine or guanidine bases can chemically bind with $CO_2$ as liquid amidinium or guanidinium alkylcarbonate salts. For example the solvent can be one or more of ethylene glycol, methanol, and ethanol.

The unit 10 can alternatively operate as a membrane-electrode unit in which a cathode 20 is provided upstream of the non-aqueous region 14 and the anion exchange membrane 18 has a dry side which functions to bind the $CO_2$ from the input gas stream on the non-aqueous region 14 of the unit. The anion exchange membrane 18 can be or include a quaternary amine which has $OH^-$ ions associated around the quaternary amine. The $OH^-$ reacts with the $CO_2$ to form $HCO_3^-$ which migrates across the anion exchange membrane as describe herein. In such a unit 10, $H_2O$ is reduced by the cathode to produce $H_2$ gas and $OH^-$. The $H_2$ gas bubbles out and the $OH^-$ reacts with the $CO_2$ in the input steam to produce $HCO_3^-$. The continuous production of $OH^-$ ensure continuous capture of $CO_2$ as $HCO_3^-$. In some units 10, the anion exchange membrane 18 can be coated with a $CO_2$ binding agent to further facilitate binding as in the systems using the $CO_2$ organic binding liquid.

The aqueous region 16 includes $H_2O$ either in a liquid form such as the presence of water itself or an aqueous electrolyte, or as humidified gas (collectively referred to herein as an aqueous fluid). The aqueous fluid can be flowed through the aqueous region or can be provided in a fixed amount. In the aqueous region $HCO_3^-$ interacts with $H_2O$ and decomposes to $CO_2$ and $CO_3^{2-}$.

The anion exchange membrane 18 can include one or more quaternary amines or phosphonium ions. The anion exchange membrane can be, for example, a polymer backbone resin with hydroxide, carbonate, and/or bicarbonate moieties to which the quaternary amines or phosphonium ions are attached. The polymer backbone can be, for example, a polystyrene. Referring to the inset of FIG. 4, the anion exchange membrane can be composed of hollow fibers. The anion exchange membrane can be formed of materials capable of withstanding high pH, such as a pH of greater than 10. For example, the presence of hydroxide, carbonate, and bicarbonate moieties on the polymer backbone as counter ions can help enable the anion exchange membrane from sustaining pH greater than 10.

The rate of capture can be tuned by adjusting the specific area of the anion exchange membrane. Higher specific area configurations, such as hollow-fibers or porous carbon or other suitable substrates can increase the rate and amount of $CO_2$ capture. For example, an anion exchange membrane hollow fiber structure having a specific area of 527 $cm^2$ per 1 $cm^2$ of the geometric area can supply $CO_2$ from ambient air to a cathode to support 350 $mA/cm^2$ of current density while maintaining steady-state $CO_2$ concentration in the electrolyte to 22 mM. This compares well with experimentally measured $CO_2$ capture flux of about 100 $\mu mol\ m^{-2}\ s^{-1}$ using capture unit 10 in accordance with the disclosure.

The capture unit 10 can further include an input gas outlet 24 in fluid communication with the input gas, such that the input gas flows into the capture unit 10 through the input gas inlet 12 for capture of the $CO_2$ and remaining components of the gas are removed from the unit 10 through the input gas outlet 24.

The input gas is any gas containing $CO_2$ and from which the $CO_2$ is to be captured. For example, the input gas can be a dilute source of $CO_2$ such as a flue gas, other industrial gas, air, or other source of anthropogenic $CO_2$. Dilute sources of $CO_2$ can include flue gas containing about 10-15% $CO_2$ in the stream and air containing greater than about 400 ppm of $CO_2$. The input gas can be at a temperature of about 20° C. to about 120° C.

Figure 9:
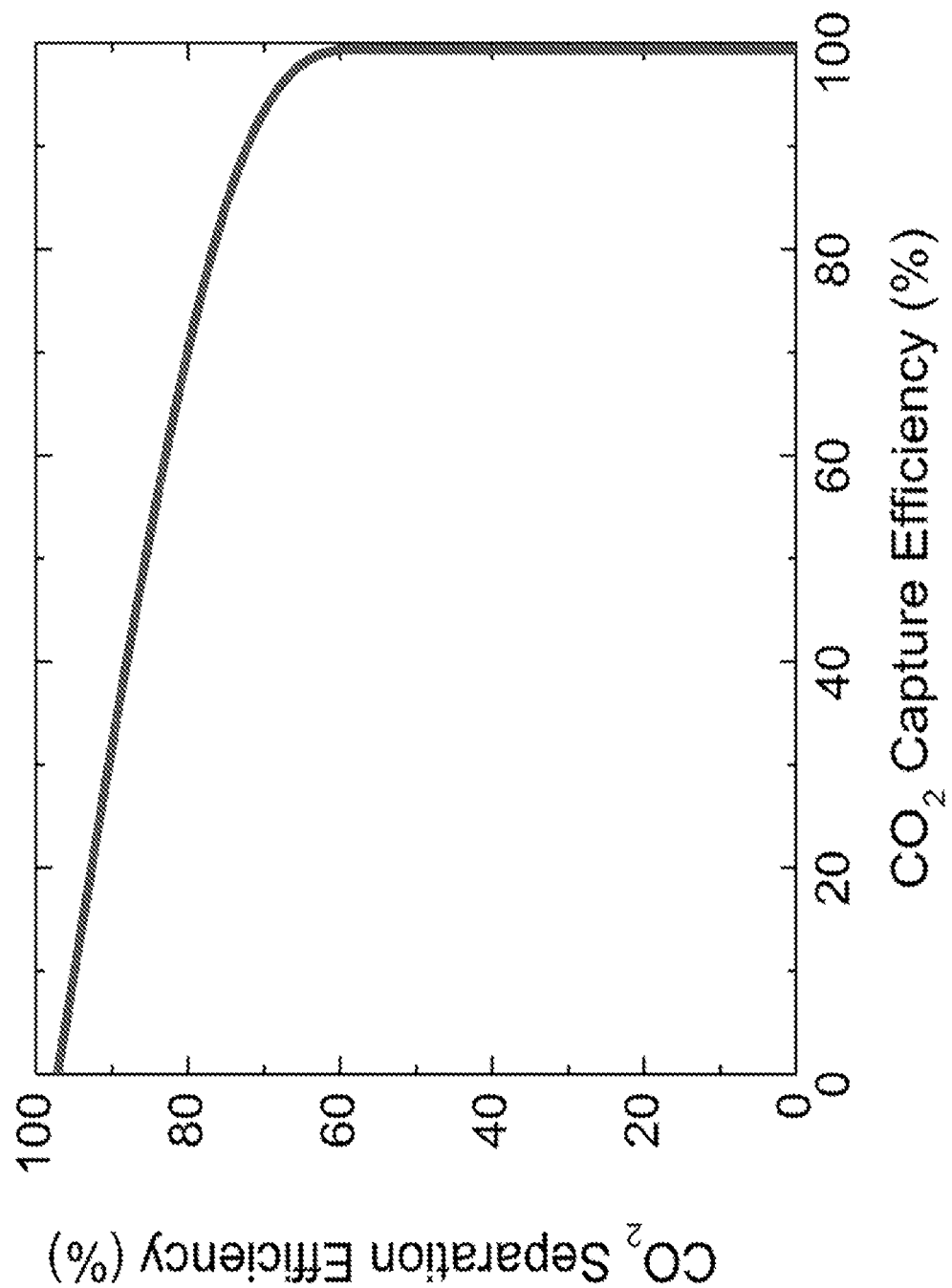
FIG. 9 is a graph of separation efficiency as a function of capture efficiency for a capture unit of the disclosure.

Capture units of the disclosure can achieve high separation efficiency while maintaining $CO_2$ capture efficiency. Referring to FIG. 9, for example, the $CO_2$ capture efficiency of about 80% can be maintained while achieving a $CO_2$ separation efficiency of 80%. Capture units and systems of the disclosure can have $CO_2$ separation efficiency and/or $CO_2$ capture efficiency between 60% and 90%. Capture efficiency and separation efficiency are calculated as follow:

$$\text{Separation efficiency} = \frac{C_{CO_2}(\text{dry})}{C_{CO_2}(\text{wet})} \times 100$$

$$\text{Capture efficiency} = \frac{CO_2 \text{ capture flux}}{CO_2 \text{ capture flux} + CO_2 \text{ crossover flux}} \times 100$$

Wherein "dry" refers to the nonaqoues regoin and "wet" refers to the aqueous region.

Capture units and systems for capture and reduction of the disclosure can operate at ambient conditions. Capture units and capture and reduction systems of the disclosure can operate in low humidity environments. This advantageously allows the capture unit to be used in a variety of manufacturing or other environments, such as indoor in residential, commercial, or industrial settings, as well as outdoor in open areas.

Figure 4:
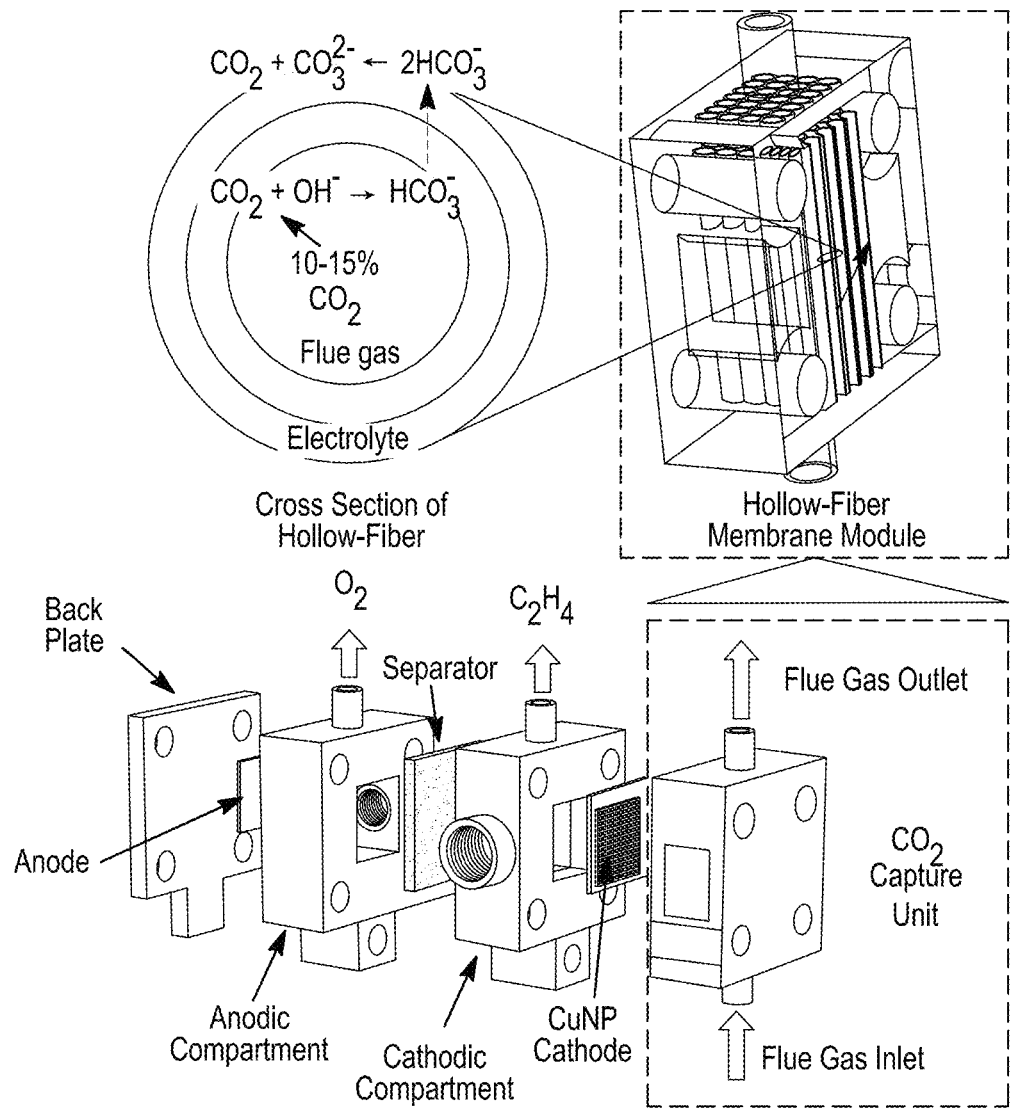
FIG. 4 is a schematic illustration of a system for $CO_2$ capture and reduction in accordance with the disclosure, with the inset showing a hollow-fiber membrane module based anion exchange membrane.
Figure 6:
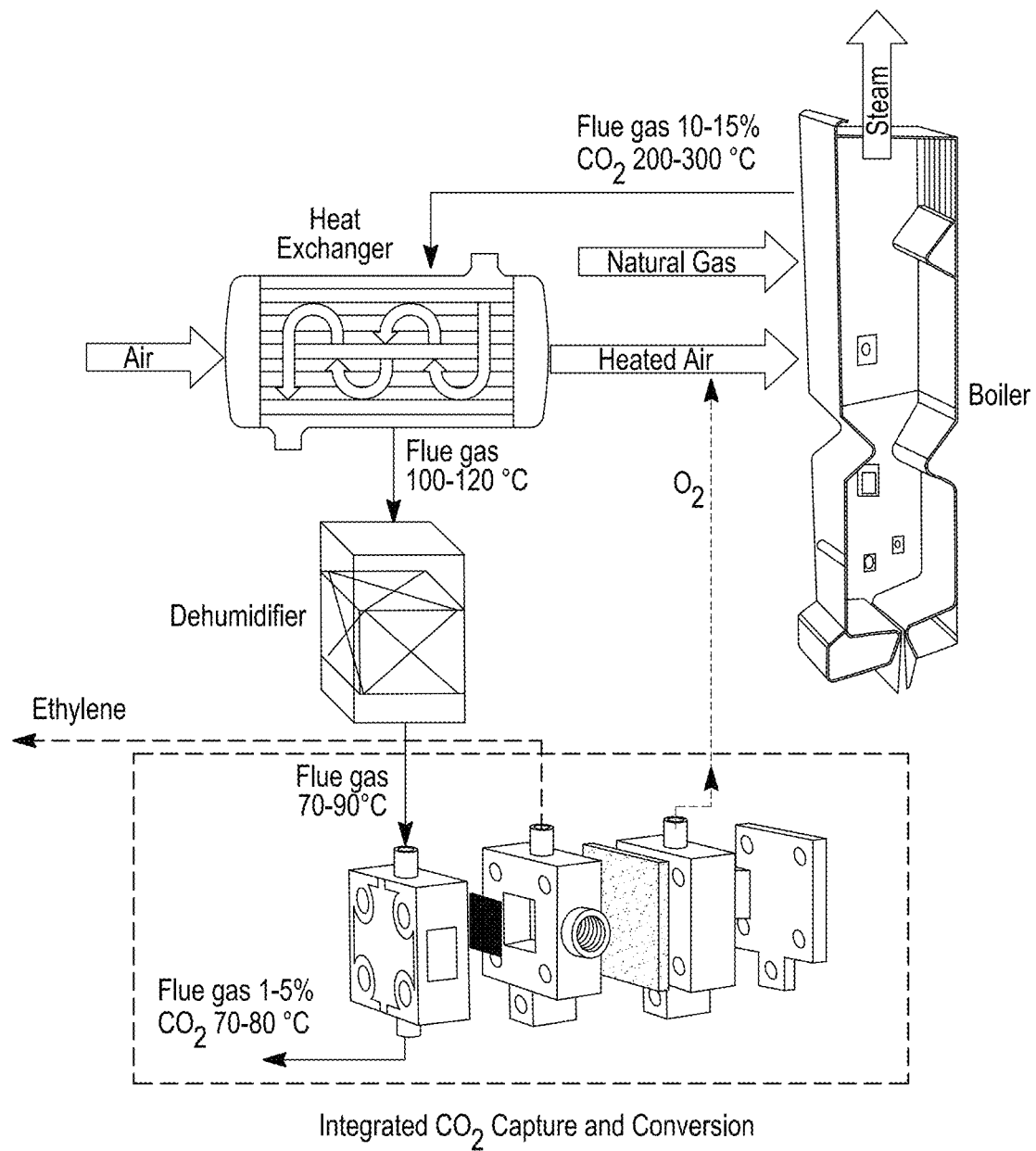
FIG. 6 is a schematic illustration of a system for capture and conversion of $CO_2$ in accordance with the disclosure.

Referring to FIGS. 3 and 4, a system 100 for active $CO_2$ capture and reduction can include any of the capture units 10 described herein with a reduction unit 30 for converting the captured $CO_2$ into a desired product gas. Desired product gases include one or more of $C_2H_4$, $C_2H_5OH$, $CH_3COOH$, $C_3H_6$, $CH_3OH$, $CH_4$, CO, and $H_2$. The system can have integrated capture and reduction. Referring to FIG. 6, a system can be configured to receive dehumidified flue gasses from a boiler system and have delivery outlets configured to release converted output gasses from the system. The system of the disclosure can be tuned to produce CO and $H_2$ (syngas) which can be recycled to act as secondary fuels for the boiler for continuous operation.

The reduction unit 30 is arranged downstream of the active $CO_2$ capture unit 10 such that the reduction unit receives the captured $CO_2$ from a $CO_2$ capture outlet arranged at the aqueous region in which the captured $CO_2$ is released through reaction with $H_2O$. The reduction unit includes catalyst 32 for reduction of the captured $CO_2$, such that when the captured $CO_2$ is flowed into the reduction unit 30, it interacts with the catalyst 32 to be reduced to one or more of $C_2H_4$, $C_2H_5OH$, $CH_3COOH$, $C_3H_6$, $CH_3OH$, $CH_4$, CO, and $H_2$. The system 10 further includes a catalyst for oxidation of $H_2O$ 36 for generation of protons for $CO_2$ reduction and $O_2$ as a byproduct. A separator 38 is disposed between the reduction unit 30 and the $H_2O$ oxidation catalyst 36. The $H_2O$ oxidation catalyst 36 can be part of or otherwise form an anode for the system. The $H_2O$ oxidation catalyst can include, for example, one or more of Ni, Fe—Ni, Pt-coated Ti, Ir, and Ru. In the system the cathode can be provided upstream of the capture unit or part of the capture unit as described herein. The system can also include an energy source. The energy source can be, for example, a photocell and/or electrochemical cell. The energy source can be integrated with the carbon capture unit 10 or can be integrated within the system into a standalone device.

The $CO_2$ reduction catalyst can be a copper mesh. For example, the copper mesh can have a mesh size of about 40 to about 120 mesh. Suitable mesh sizes include about 40, 45, 50, 55, 60, 65, 70, 75, 80, 85, 90, 95, 100, 105, 110, 115, and 120, and any values there between or ranges defined by values there between.

The $CO_2$ reduction catalyst can include or be formed as metal nanocrystals. For example, the metal nanocrystals can be grown on a mesh substrate. For example, Cu nanocrystals can be used as the $CO_2$ reduction catalyst. The Cu nanocrystals can be Cu nanocubes having dominate (100) facets. The catalyst can be prepared, for example, by spray coating Cu-nanocube nanoparticle ink onto carbon paper or electrodeposition or the like. The metal nanocrystals can be formed into different sizes and shapes and formed by cyclic oxidation-reduction of polycrystalline metal films, such as Cu In systems of the disclosure, the $CO_2$ capture unit 10 and the reduction unit 30 can be spaced a distance of about 5 mm to about 20 mm.

A method for capturing $CO_2$ can include flowing an input gas containing the $CO_2$ to be captured into a $CO_2$ capture unit as described herein. Upon introduction of the input gas into the non-aqueous region of the capture unit, a $CO_2$ binding organic liquid comprising OH⁻ and/or OH⁻ present on or associated with the anion exchange membrane chemisorbs the $CO_2$ and converts to $HCO_3^-$. The $HCO_3^-$ migrates across the anion exchange membrane, at which a gradient of moisture exists into the aqueous region. The gradient of moisture facilitates transport across the membrane. The method can further include application of an electric field across the capture unit to further assist in transport of the $HCO_3^-$ across the membrane. The applied electric field can be applied as a static voltage in the range of about 3 to about 10 V. Optionally the applied electric field can be generated within the system. In the aqueous region, the $HCO_3^-$ interacts with $H_2O$ present in the aqueous region and decomposes to $CO_2$, which can be flowed to a captured $CO_2$ outlet.

As discussed above, the capture unit or system containing the capture unit 10 can include a cathode 20, at which $H_2O$ is reduced to $H_2$ and OH⁻. The $H_2$ bubbles out and can be released upstream of the capture unit and the OH⁻ can be flowed into the non-aqueous region for binding of the $CO_2$. Water can be continuously flowed as humidified nitrogen into and/or recirculated through the capture unit to provide a continuous source of OH⁻ to the non-aqueous region for continuous binding operation. The $H_2$ released from the reduction of $H_2O$ by the cathode can be used to power the reduction unit or can be oxidized to generate protons for the reduction.

In systems of the disclosure further including a reduction unit, the $CO_2$ captured and released from the capture unit is flow into the reduction unit where it interacts with a $CO_2$ reduction catalyst that reduces the $CO_2$ to one or more desired product gas 34. The anode arranged downstream of the cathode can serves as a catalyst for oxidation of $H_2O$, and reduces the $H_2O$ to provide protons to the reduction catalyst. The oxidation of $H_2O$ by the anode results in the production of $O_2$ as a byproduct. The system advantageously separates the oxidation of $H_2O$ spatially from the reduction of the $CO_2$ by having a spacer arranged between the $H_2O$ oxidation catalyst (the anode) and the reduction unit. This advantageously separates the $O_2$ byproduct gas stream from the product gas stream 34 to provide a high purity product gas stream.

The systems of the disclosure can be an integration of the active $CO_2$ capture unit and $CO_2$ reduction unit with a flowing of electrolyte in the aqueous side of the $CO_2$ capture unit to the cathode compartment of the $CO_2$ reduction unit.

Theoretical Modeling

A one-dimensional model for moisture-gradient membrane adjacent to an aqueous electrolyte was developed as seen in FIG. 1B using COMSOL Multiphysics to solve Nernst-Planck equation for the transport of different ionic species. A time dependent analysis was done to see the development of concentration profiles of the species in the membrane. The carbonate-bicarbonate equilibrium reactions were set to be water-dependent and the adjacent electrolyte was modeled as a well-mixed electrolyte with high diffusion coefficients for all the species.

Species considered in the model: Based on the proposed moisture-gradient mechanism for $CO_2$ capture, a total of 8 species were considered in the simulation: i) $CO_2$ as the main species for moisture-gradient capture, ii) $H_2O$ for the moisture content on the dry side and also in the electrolyte adjacent to the membrane contributing to the moisture gradient, iii) $H^+$ from dissociation of $H_2O$, iv) $OH^-$ from dissociation of $H_2O$ and for $CO_2$ capture from Step 1 of the moisture-gradient mechanism, v) $HCO_3^-$ for the water-dependent equilibrium kinetics in the membrane, vi) $CO_3^{2-}$ also for the water-dependent equilibrium kinetics, vii) $K^+$ counter ion to carbonates and bicarbonates in the membrane and the adjacent electrolyte and does not contribute to moisture-gradient mechanism, and viii) $NR_4^+$ as the background quaternary amine on the membrane.

Transport of species: Only diffusion and ionic mobility due to the applied electric field were assumed to be driving the transport of the species in the absence of convection. Since the transport mechanism is facilitated by the concentration of water, the diffusion was also dependent on the water uptake $\lambda$ of the membrane which in turn is dependent on the water concentration on the dry side. $\lambda$ is defined as the concentration of water per unit concentration of the membrane background ($NR_4^+$). The governing equation used in the model was:

$$\frac{\partial C_j}{\partial t} + \nabla \cdot J_j = R_j \tag{1}$$

where $C_j$ is the concentration, $J_j$ is the flux, and $R_j$ is the reaction rate of the of the $j^{th}$ species. The total diffusive and ionic mobility flux is given by:

$$J_j = D_j \nabla C_j - z_j u_{m,j} F C_j \nabla V \tag{2}$$

where $D_j$ is the $\lambda$ dependent diffusion coefficient $D_j(\lambda)$, $z_j$ is the charge number, $u_{m,j}$ is the ionic mobility of the $j^{th}$ species. F is the Faraday's constant and V is the potential. Since we are solving Nernst-Planck equation but there's no applied potential at the membrane, an electroneutrality condition is imposed by:

$$\Sigma z_j C_j = 0 \tag{3}$$

Reactions in membrane: The moisture-gradient $CO_2$ capture is implemented using water-dependent carbonate bicarbonate equilibrium reactions. The $H_2O$ dissociation reaction considered in the model was:

$$H_2O \overset{k_w}{\rightleftharpoons} H^+ + OH^- \tag{4}$$

The carbonate-bicarbonate equilibrium reactions are given by:

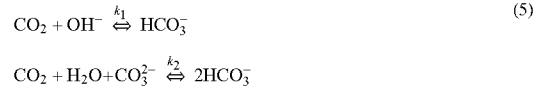

$$CO_2 + H_2O + CO_3^{2-} \overset{k_2}{\rightleftharpoons} 2HCO_3^-$$

The activity of $H_2O$ in all the reactions in the membrane is not considered to be unity and was calculated as $\lambda \times [NR_4^+]$.

Boundary conditions: On the dry side of the membrane, an inward flux of the $CO_2$ feed was established as:

$$N_{i,CO_2} = -n \cdot J_{CO_2,feed} \tag{6}$$

where $N_{i,CO_2}$ is the inward flux determined from the $CO_2$ capture kinetic experiments and $-n$ is the normal vector pointing inward in the model. To implement a complete carbon dioxide capture and utilization process, the moisture-gradient $CO_2$ capture was combined with electrochemical utilization of $CO_2$ to CO. This electrochemical integration was implemented in the form of a boundary condition as a flux of $CO_2$ removal given by:

$$N_{o,CO_2} = -F_{CO_2} \tag{7}$$

where $N_{o,CO_2}$ is the outward flux of $CO_2$ and the flux of $CO_2$ $F_{CO_2}$ is given by:

$$F_{CO_2} = \frac{I}{nF} \tag{8}$$

where I is the current density of $CO_2$ utilization and n is the number of electrons transferred for the conversion of $CO_2$ to CO (n=2).

EXAMPLES

Example 1: Simulated Capture Process

As the $H_2O$ concentration decreases on the non-aqueous "dry" side, the equilibrium constant also decreases to favor the formation of $HCO_3^-$. A continuum model using COMSOL Multiphysics software can be used to simulate the moisture-gradient-driven $CO_2$ capture process. The objective of these simulations is to quantify the effects of physical properties of AEM such as water sorption, water permeability, ion-exchange capacity, ion conductivity, ion selectivity, $CO_2$ crossover, porosity, and membrane thickness on three key performance metrics, namely, $CO_2$ capture efficiency (defined as the ratio of $CO_2$ capture flux to the sum of $CO_2$ capture and $CO_2$ crossover fluxes), $CO_2$ separation efficiency (defined as the ratio of captured $CO_2$ concentration at the aqueous "wet" side to the $CO_2$ concentration in the absence of $CO_2$ crossover), and energy requirement (defined as the total energy consumed per mole of $CO_2$ captured).

Figure 7:
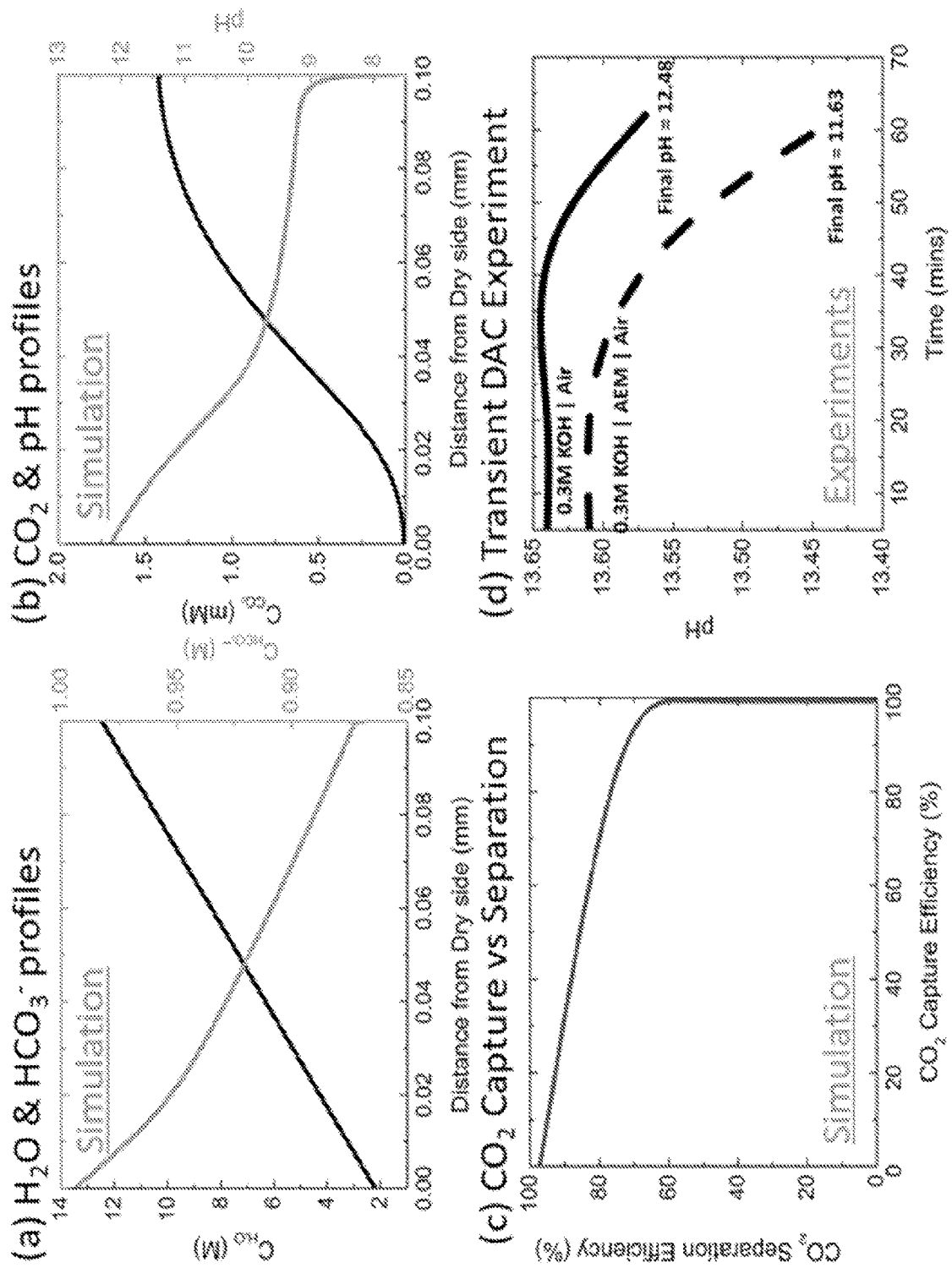
FIG. 7A is a graph of $H_2O$ and $HCO_3^-$ counter-diffusion profiles for a multi-physics simulation of direct $CO_2$ capture from the air using a moisture-gradient process.
FIG. 7B is a graph of the $CO_2$ and pH profiles of the multi-physics simulation of direct $CO_2$ capture from the air using a moisture-gradient process.
FIG. 7C is a graph showing the performance curve relationship between $CO_2$ separation and capture efficiencies of an Excellion anion exchange membrane for the multi-physics simulation of direct $CO_2$ capture from the air using a moisture-gradient process.
FIG. 7D is a graph showing experimentally measured pH change in 0.3 KOH electrolyte when air is directly sparged (solid) compared to when Excellion (dashed) is used as a contactor. The change in pH is related to $CO_2$ capture.

FIG. 7A shows the counter-diffusion of $H_2O$ and $HCO_3^-$ in the membrane when RH of the "wet" side is 100%, and the "dry" side is 20%. The flux of $HCO_3^-$ governs the $CO_2$ capture flux. The increase in the $CO_2$ concentration on the "wet" side increases the back-diffusion or crossover of $CO_2$ to the "dry" side, which is shown in FIG. 7B along with the pH gradient inside the membrane.

The crossover loss of $CO_2$ can be minimized by direct utilization of $CO_2$ on the "wet" side. The computed performance curve for the Excellion AEM is given in FIG. 7C, which shows the $CO_2$ separation efficiency decreases with an increase in the $CO_2$ capture efficiency. This behavior is due to a decrease in the $CO_2$ concentration on the "wet" side with an increase in $CO_2$ utilization flux, which is equal to $CO_2$ capture flux at steady-state. The ideal shape of the performance curve should be square, such that $CO_2$ separation efficiency is 100% for varying values of $CO_2$ capture flux or efficiency. This performance curve will be matched with the $CO_2$ utilization (conversion) efficiency of one or more suitable catalysts in the integrated system.

Moreover, the effectiveness of the moisture-gradient process to capture $CO_2$ from the air can be experimentally evaluated. FIG. 7D shows the experimentally measured pH change when air was directly sparged to 0.3M KOH electrolyte, as compared to the case when AEM (Excellion) is used as a contactor. The decrease in pH was found to be directly related to the increase in $CO_2$ concentration in the electrolyte. The difference between the final pH (measured after 5 hours) in both cases was >1 unit, which indicates an order of magnitude higher moles of $CO_2$ captured using a moisture-gradient process.

The specific area of AEM used here was 1 $cm^2/cm^2$. The rate and amount of $CO_2$ capture can be substantially improved by using higher specific area configurations such as a hollow-fiber module or porous carbon or other suitable substrates.

Example 2

FTIR spectroscopy: FTIR spectroscopy was performed to quantify the concentration of $CO_3^{2-}$ and $HCO_3^-$ for varying $H_2O$ concentration in a non-aqueous solvent ($CH_3OH$) to understand the shift in the equilibrium as a function of the concentration of water. The FTIR bench was a Bruker Invenio S with a Pike VeeMax II variable angle attenuated total reflectance (ATR) accessory and a 60° Ge face-angled crystal. A mid-band liquid $N_2$ cooled MCT detector was used, and for each experiment, the spectra acquired were averaged over 1500 acquisitions at a resolution of 4 $cm^{-1}$. The intensity of $HCO_3$ band at 1633 $cm^{-1}$ and the $CO_3^{2-}$ band at 1450 $cm^{-1}$ were individually calibrated at different concentrations of $HCO_3^-$ and $CO_3^{2-}$ in $CH_3OH$. A custom-made 3D printed cell of maximum capacity 4 ml was placed on top of the Ge crystal, where all the FTIR experiments were performed.

Initially, known amounts of $NaHCO_3$ were dissolved in pure $CH_3OH$ and the spectra taken showed the increase in the intensity of one of the $HCO_3^-$ stretching bands with the increase in its concentration at 1633 $cm^{-1}$. $CH_3OH$ was chosen as a solvent to retain the $HCO_3^-$ in their pure form and prevent them from equilibrating with $CO_3^{2-}$ as seen in an aqueous system. $HCO_3^-$ were calibrated by relating the known concentration of $NaHCO_3$ dissolved in $CH_3OH$ to the intensity at 1633 $cm^{-1}$. Similarly, the $CO_3^{2-}$ were calibrated by observing the change in the intensity at 1450 $cm^{-1}$.

To study the equilibrium kinetics, a known amount of NaOH was dissolved in $CH_3OH$ and $CO_2$ was sparged into the system, resulting in the conversion of $OH^-$ to $HCO_3^-$. The concentration of $HCO_3^-$ was determined using the previously established calibration curve. A small amount of $H_2O$ was added to this solution and the spectra were recorded to quantify $CO_3^{2-}$ formed via $HCO_3^-$ decomposition (see FIG. 10A). The same experiment was repeated with increasing quantities of $H_2O$ to quantify the $H_2O$-dependent equilibrium constant (see FIG. 10A). Since the equilibrium of bicarbonate decomposition reaction also produces $H_2O$ when the reaction shifts from $HCO_3^-$ to $CO_3^{2-}$, the quantity of $H_2O$ in the solution is larger than the quantity added. This extra $H_2O$ was quantified by Karl-Fisher (KF) Titrations Karl Fischer titration: KF titrations were performed to determine the total water content in the system containing the previously determined $HCO_3^-$ and $CO_3^{2-}$. A custom-made 3D-printed cell of the same capacity as the cell used in the FTIR was used for this study. A solution of $CH_3OH$, $NaHCO_3$, and a known amount of $H_2O$ in the cell was well mixed using a magnetic stirrer. Two Cu electrodes were placed on the opposite ends of the cell and the open circuit potential (OCP) of the cell was constantly monitored. 20 µl of KF titrant was added to the cell periodically and the endpoint was detected by a sharp increase in the OCP of the cell. This endpoint is an indicator of the total $H_2O$ in the solution. Therefore, the combination of FTIR and KF titrations can provide $HCO_3^-$, $CO_3^{2-}$ and $H_2O$ concentration and the equilibrium constant for $2HCO_3^- \rightarrow CO_2 + CO_3^{2-} + H_2O$ can be calculated using the equation below—

$$K = \frac{[CO_2][CO_3^{2-}][H^2O]}{[HCO_3^-]^2} \approx \frac{[CO_3^{2-}]^2[H^2O]}{[HCO_3^-]^2}$$

Figures 10A, 10B:
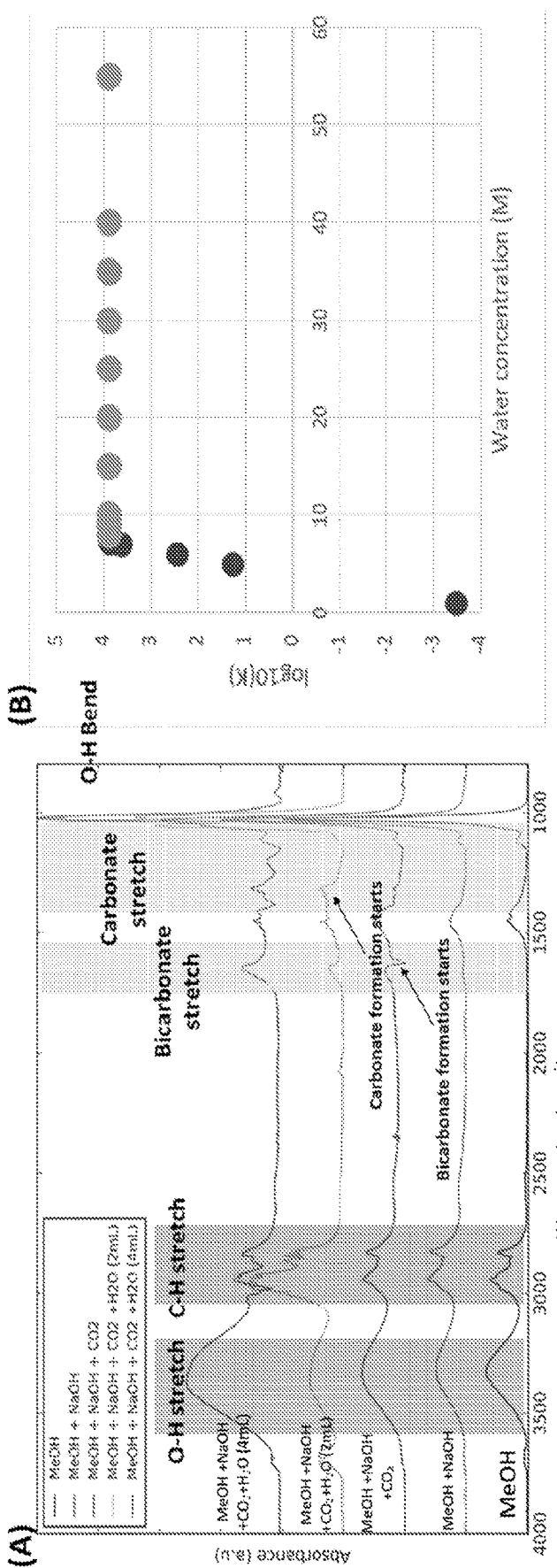
FIG. 10A is FTIR spectra of pure $CH_3OH$ (MeOH), NaOH dissolved in MeOH, $CO_2$ sparged NaOH+MeOH solution, and $CO_2$ sparged NaOH+MeOH solution with added $H_2O$. The $HCO_3^-$ stretch is dominant in $CO_2$ sparged NaOH+MeOH solution, which decreases along with increase in $CO_3^{2-}$ stretch with increasing $H_2O$.
FIG. 10B log(K) increases rapidly with increasing $H_2O$ and reaches a plateau corresponding to the bulk pKa of −3.87 for aqueous $HCO_3^-$ solution.

Here $[CO_2] = [CO_3^{2-}]$ because of the reaction stoichiometry and $CO_2$ concentration is much smaller than the solubility limit. FIG. 10B shows a linear increase in $\log_{10} K$ with increasing $H_2O$, which reaches a plateau of ~3.87 around 8 M $H_2O$ concentration.

Kinetics of $CO_2$ capture: $CO_2$ capture experiments were performed using a basic organic solution consisting of 1.2M KOH dissolved in a $CO_2$ organic binding liquid comprised of 80% ethylene glycol (EG) and 20% choline hydroxide (CH). Ethylene glycol was used as a non-aqueous solvent due to the higher solubility of KOH and its higher boiling point (~197° C.), and CH was used for its high affinity for $CO_2$ capture. $CO_2$ was sparged into the solution where it reacts with the $OH^-$ from the dissolved KOH to form $HCO_3^-$.

First, a calibration curve was obtained by measuring the variation in the resistance of the organic solution with an increase in the $HCO_3^-$ concentration. The calibration solutions had a fixed $K^+$ concentration of 1.2M and varying $HCO_3^-/OH^-$ concentrations. The resistance of the solution was measured using electrochemical impedance spectroscopy (EIS). FIG. 11A shows almost linear variation in resistance of solution with increasing mole fraction of $HCO_3^-$, which can be used to determine $CO_2$ chemisorbed as $HCO_3^-$.

An efficient gas sparger of ~2 µm size was used to increase the contact of air with the organic solution of ~3 ml volume at room temperature (~20° C.). The dynamic change in the resistance of the solution was converted into $HCO_3^-$ concentration using the calibration curve. FIG. 11B shows a steady increase in the moles of $CO_2$ absorbed in the solution with an average rate of ~8.3 µmol/s. The rate of $CO_2$ capture can be increased by using ionic liquids with high $CO_2$ solubility. These ionic liquids will increase the dissolved concentration of molecular $CO_2$, which will then increase the rate of $CO_2$ chemisorption with $OH^-$.

Figure 12:
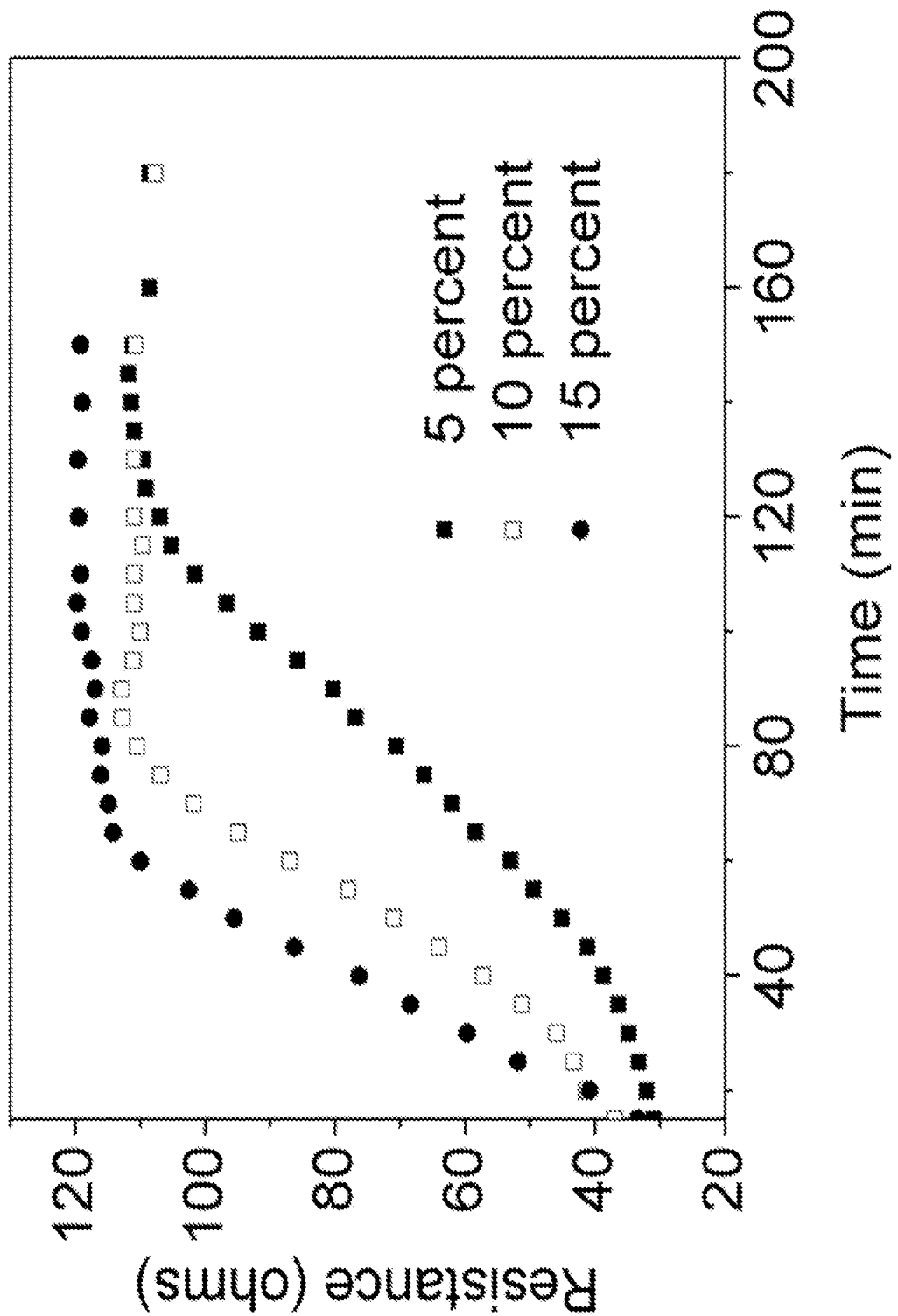
FIG. 12 is a graph of resistance as a function of time, showing that the higher the concentration of the $CO_2$ in the input gas, the less time required to completely saturate with bicarbonate ions.

The amount of $CO_2$ captured on the dry side of the unit was quantified by conversion of hydroxide to bicarbonate formation. Referring to FIG. 12, it was observed that the higher the concentration of the $CO_2$ in the input gas, the less time required to completely saturate with bicarbonate ions.

Figure 13:
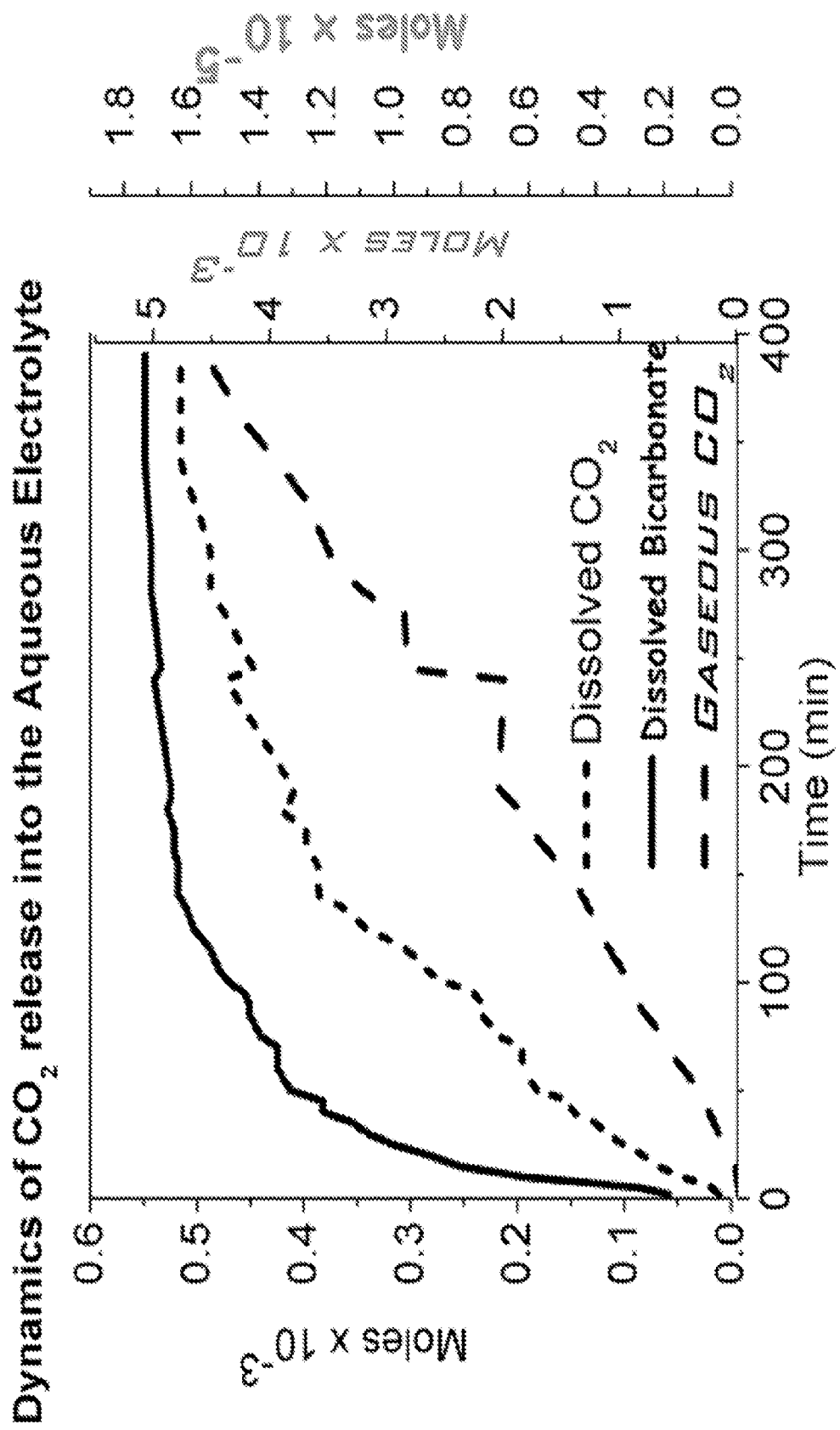
FIG. 13 is a graph showing the dynamic increase in the concentration of $HCO_3^-$, dissolved and gaseous $CO_2$ due to migration of $HCO_3^-$ from organic solution.

Dynamics of $CO_2$ Transport and Release: Under the applied electric field, $HCO_3^-$ in organic solution will migrate towards aqueous electrolyte and decrease its pH over time. An electrochemical cell shown in FIG. 2 was used to measure the current and pH change in the aqueous electrolyte. The $CO_2$ release experiment was performed using chronopotentiometry, where the total current was fixed to 25 mA. Since $HCO_3^-$ was the majority charge carrier in organic solution and anion exchange membrane, the rate of $HCO_3^-$ migrated is directly proportional to the current (I) such that $r_{HCO_3^-}$=I/F, where F is Faraday's constant. The measured pH and $r_{HCO_3^-}$ can be used to calculate the concentration of $HCO_3^-$, $CO_3^{2-}$, dissolved $CO_2$ and gaseous $CO_2$, which are shown in FIG. 13. The majority of carbon species in the aqueous solution are dissolved and gaseous $CO_2$. While the dissolved $CO_2$ plateaus around 250 mins, the gaseous $CO_2$ (dotted line) is continuously released from the solution at a steady rate. The experimentally measured moles of $CO_2$ released over 6 hr had a record flux of 2.3 mmol/m²s.

Figure 14:
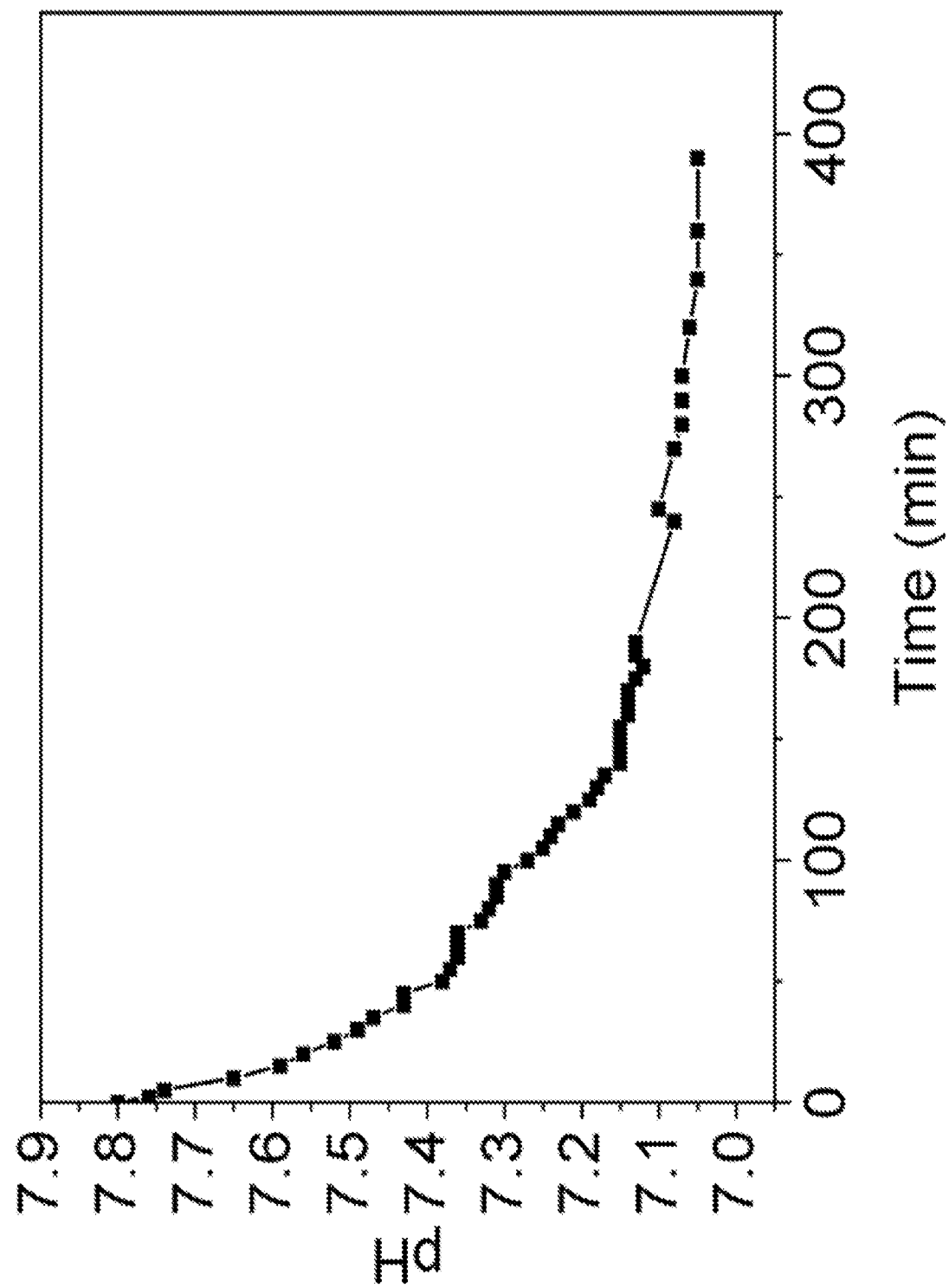
FIG. 14 is a graph of pH as a function of time showing the amount of $CO_2$ migrated with time as observed by a drop in pH.

Referring to FIG. 14, the amount of $CO_2$ migrated with time was quantified by observing a pH drop on the wet-side.

Figure 11:
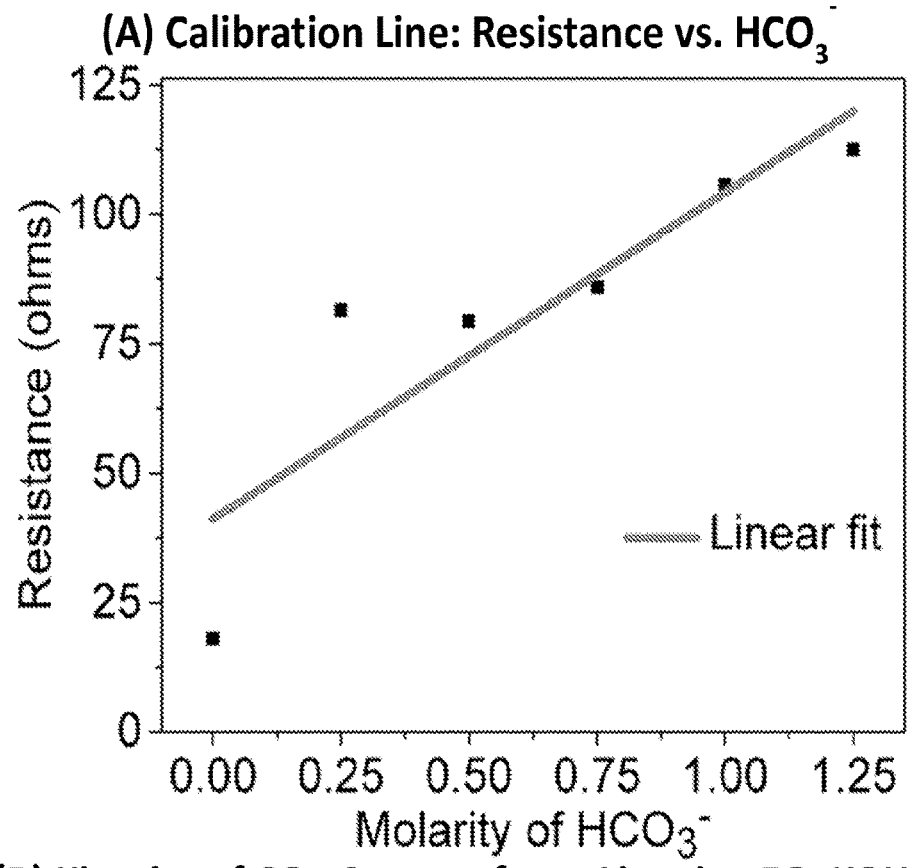
FIG. 11A is a calibration curve showing nearly linear dependence of solution resistance on concentration of $HCO_3^-$.
FIG. 11B is a graph showing total moles of $CO_2$ captured in a solution of 1.2M KOH in ethylene glycol. The average $CO_2$ capture rate is ~8.3 μmol/s.
Figure 11:
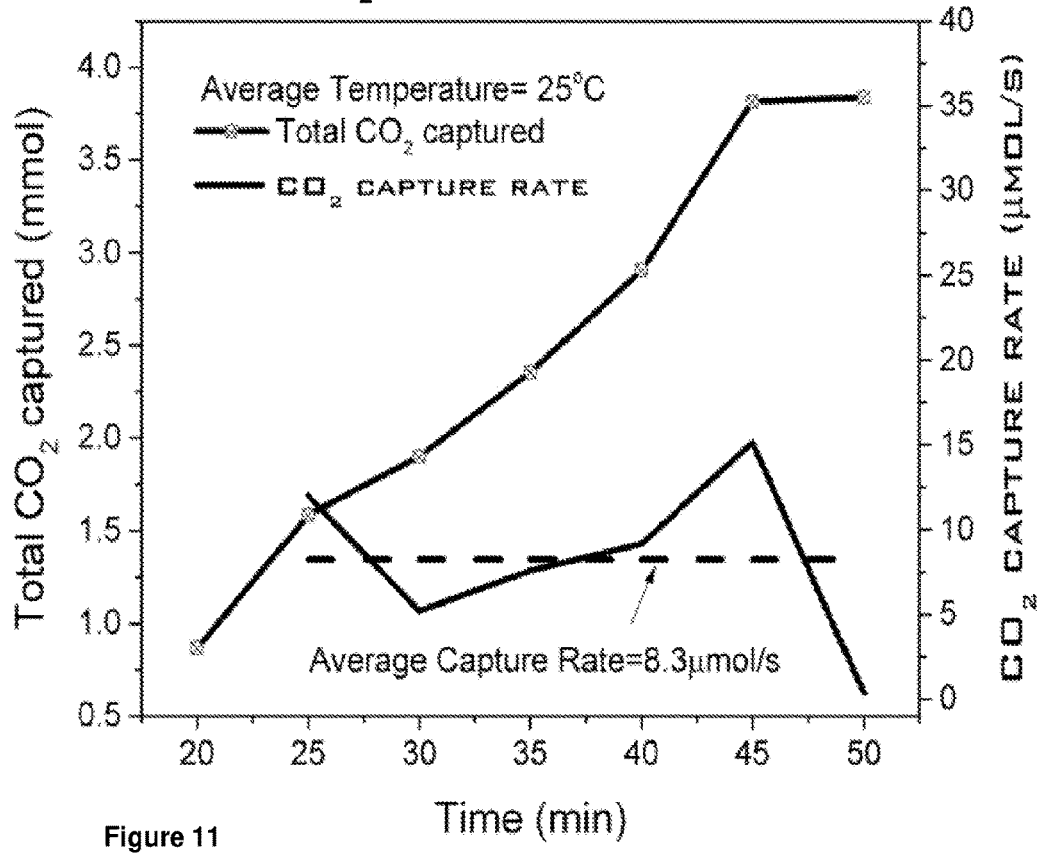

Since the electrochemical cell had an anion exchange membrane area of 4 cm², the total rate of $CO_2$ transport and release was ~1 μmol/s which was ~8 times smaller than the $CO_2$ capture rate in FIG. 11. Therefore, the maximum $CO_2$ release rate of ~8 μmol/s can be achieved by either increasing the current or membrane area by 8 folds. The energy consumption of this process is primarily determined by the applied cell potential, which was ~6 V for the current process. It was observed that he applied cell potential can be substantially decreased by adding ionic liquids, which will also increase the $CO_2$ capture capacity of the organic solution. It was also observed that the ionic liquid properties can also be tuned to decrease the $H_2O$ uptake of the organic solution.

Table 1 shows a comparison of $CO_2$ capture fluxes of various prior known materials and the materials of the disclosure.

TABLE 1

Comparison of $CO_2$ capture fluxes for known materials

| Material | Type | $CO_2$ Flux (mmol/m²-s) |
|---|---|---|
| Moisture-gradient of the present disclosure | Solid | 1.21E−06 |
| $K_2CO_3$/AC | Solid | 1.21E−06 |
| ALUMINA/DETA | Solid | 6.31E−04 |
| NANOCLAY W/AMINE | Solid | 9.47E−05 |
| PMMA W/AMINE | Solid | 8.87E−07 |
| $SiO_2$ + PEI | Solid | 6.29E−05 |
| AL-CaO MOF | Solid | 5.77E−05 |
| POLYAMINE-PHOSP | Solid | 3.31E−05 |
| PMMA + TEPA | Solid | 2.62E−06 |
| $CeO_2$ | Solid | 1.51E−09 |
| TMAG on PMMA | Solid/liquid | 1.04E−06 |
| TEPA $NO_3$ on $SiO_2$ | Solid/liquid | 6.67E−05 |
| $SiO_2$ + ionic liquids | Solid/liquid | 1.29E−06 |
| ZrP/BMIMCl | Solid/liquid | 8.47E−07 |
| EMIM lys PMMA | Solid/liquid | 9.00E−07 |
| Ionic liquid + graphene oxide | Solid/liquid | 3.37E−07 |
| [bmim][acetate]-ENIL | Solid/liquid | 1.89E−06 |
| Piperizine | Liquid | 2.00E−06 |
| MEA + nanoparticles | Liquid | 1.6E−02 |

Figure 15A:
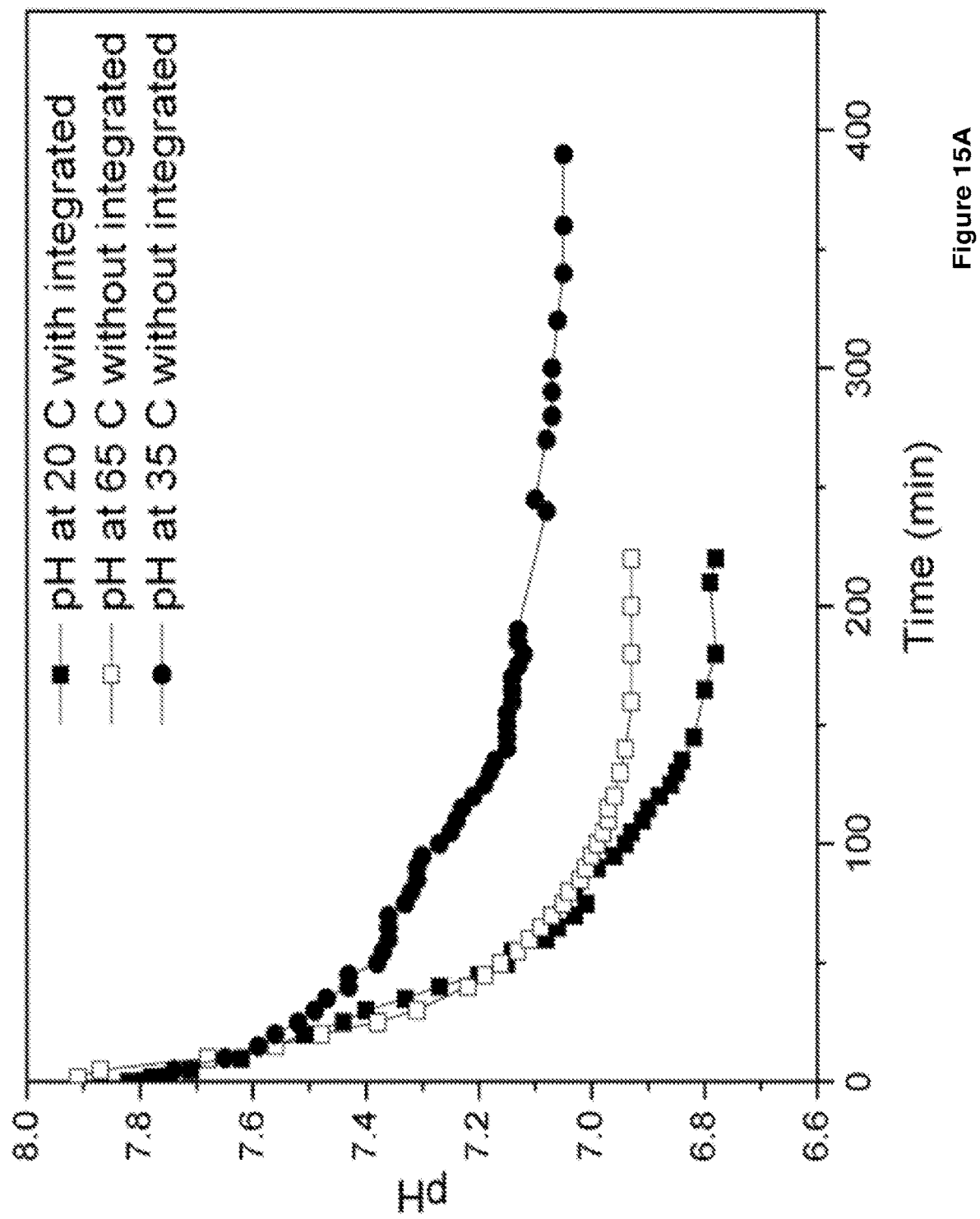
FIG. 15 is a graph of pH as a function of time showing the effect of the integration of both capture and reduction processes on the migration process.

FIG. 15A shows the effect of the integration of both capture and reduction processes on the migration process. As shown in FIG. 15, improved performance resulted from integration because a constant source of bicarbonate ions was present. The aqueous electrolyte used in this set-up was 0.1M KOH.

Figure 15B:
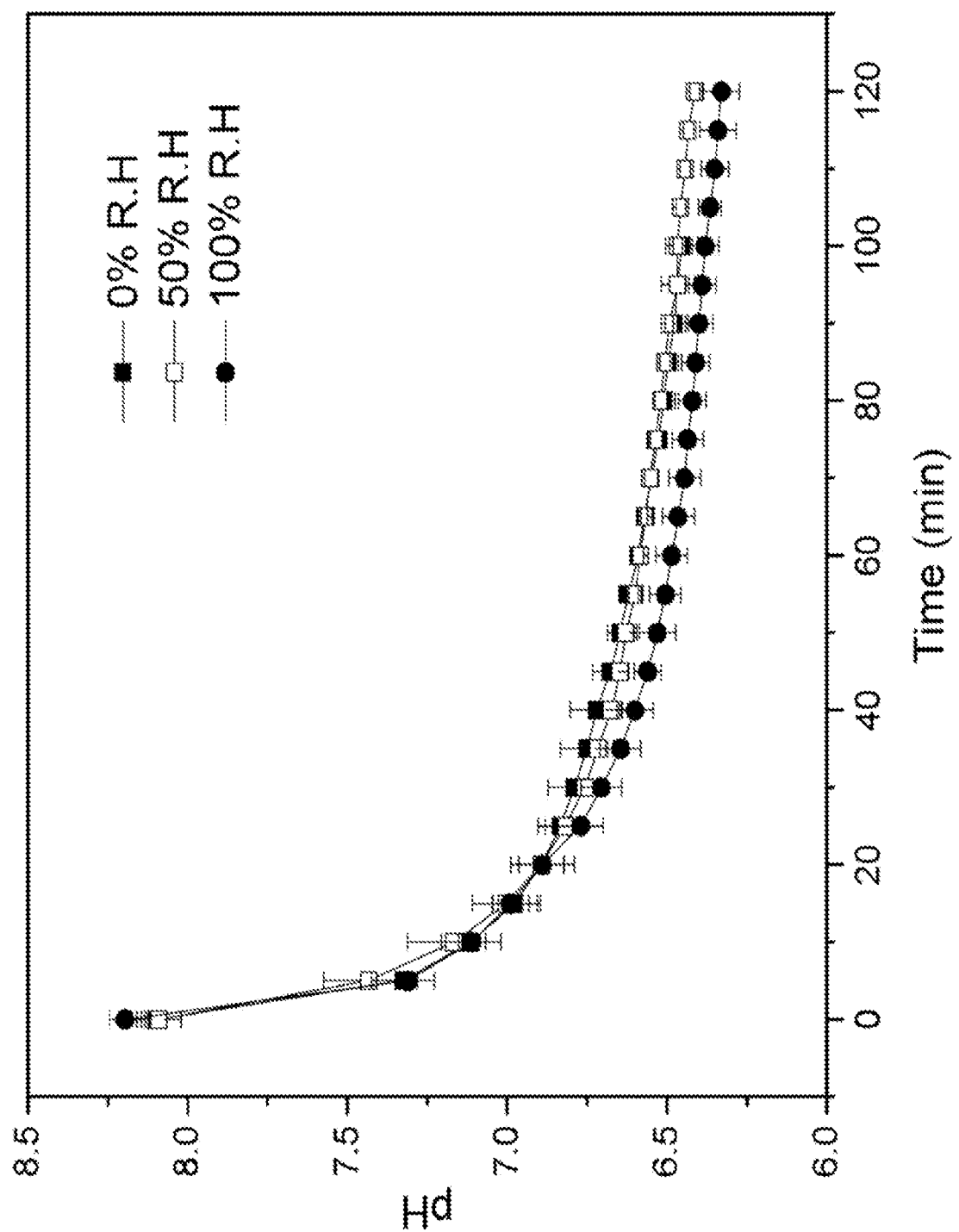

FIG. 15B shows the effect of humidity on the migration process. In this test, the aqueous electrolyte was 1 M KCl and 0.1M $KHCO_3$. The non-aqueous capture solution was maintained at about 95° C. and the simulated input gas was a flue gas at 25° C.

Example 3: Reduction

Figure 16:
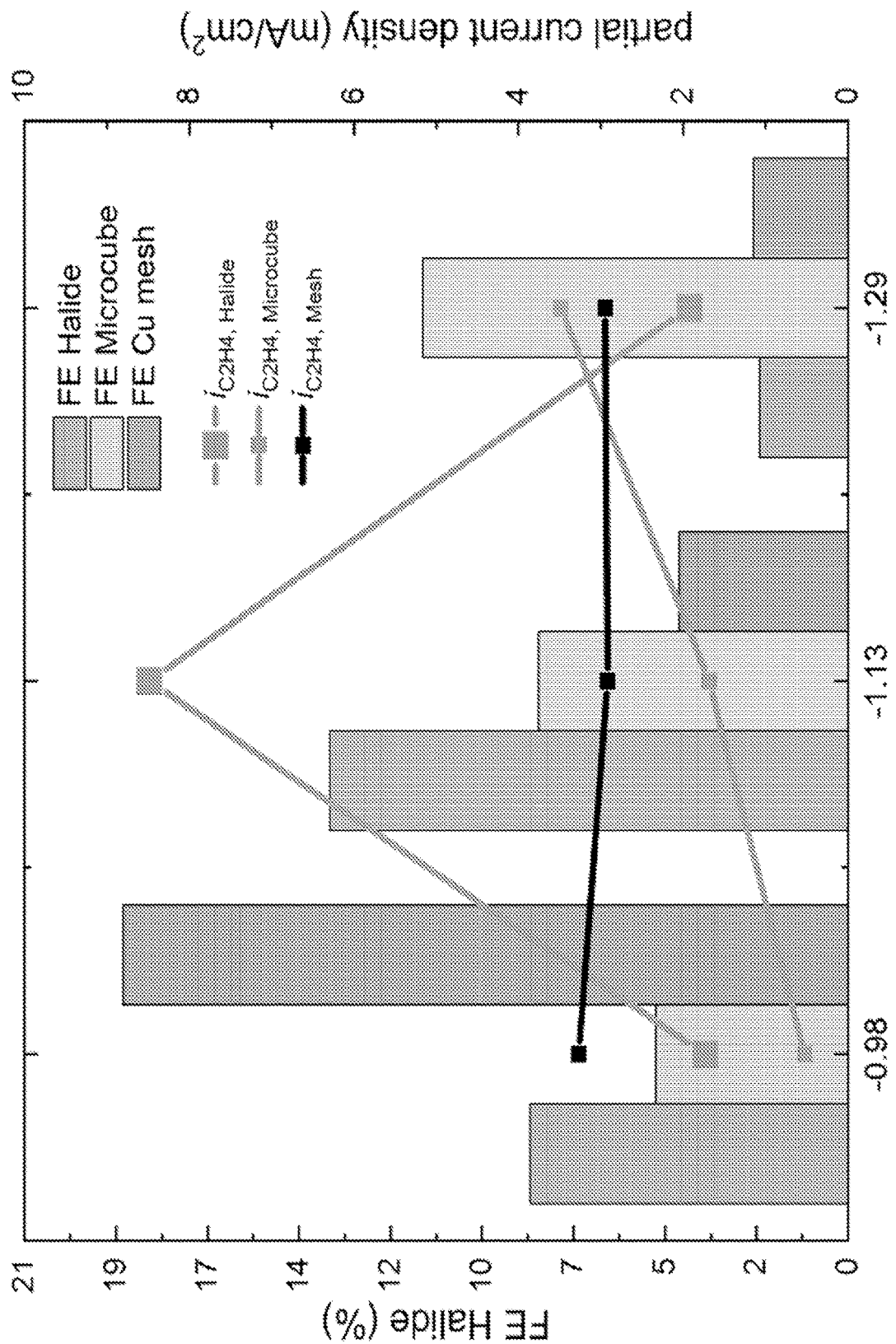
FIG. 16 is a graph showing FE halide percentate as a function of applied potential for different catalysts in a system of the disclosure.

Various reduction catalysts were tested including Halide mediated Cu, micro-cubic Cu, and Cu mesh. Cu mesh was observed to provide the highest reduction efficiency as shown in FIG. 16. The experimental set up used is shown in FIG. 5A.

Figure 17A:
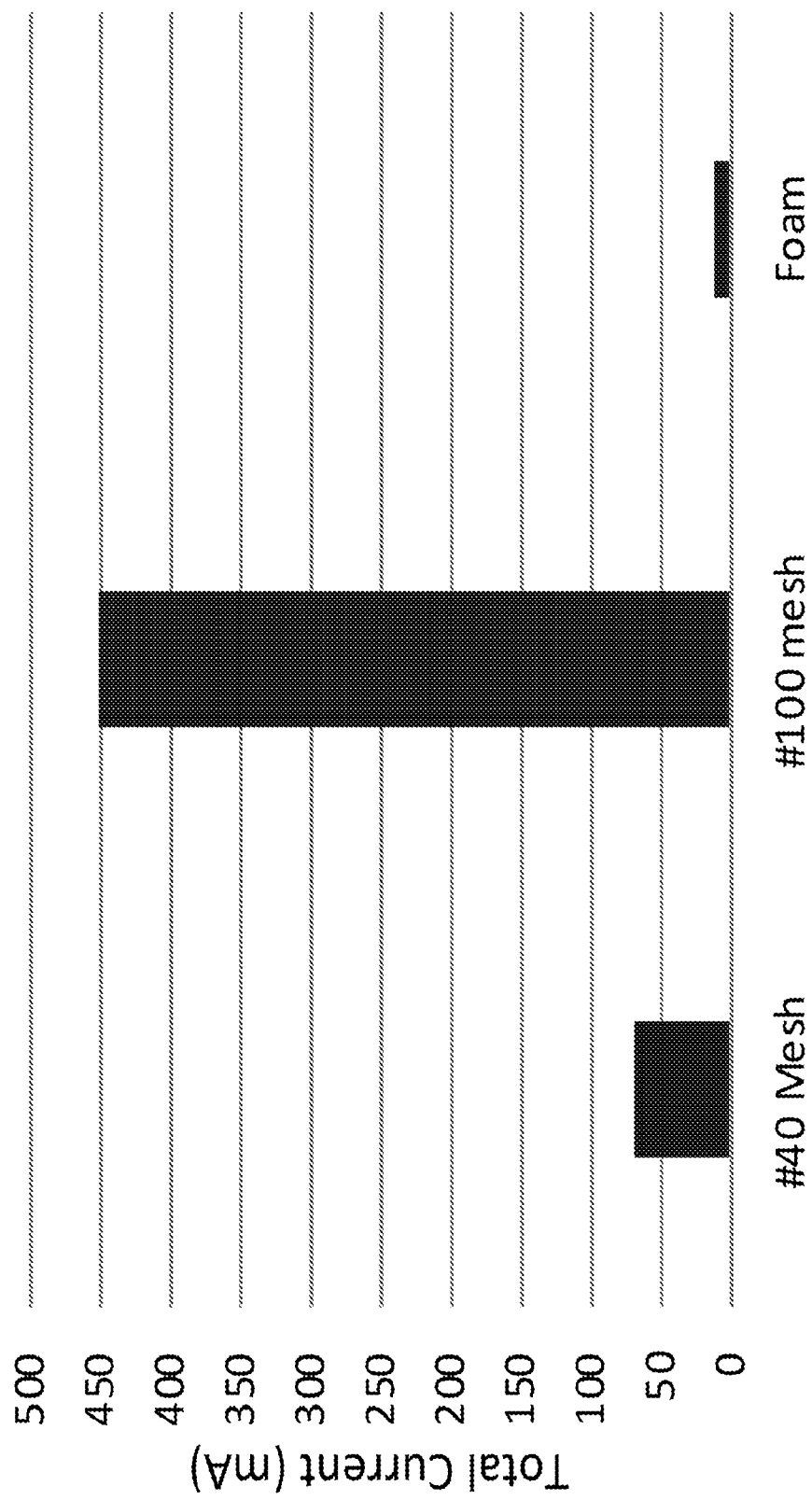
FIG. 17A is a graph showing total current for a #40 mesh Cu catalyst, a #100 mess Cu catalyst and a foam Cu catalyst.
Figure 17B:
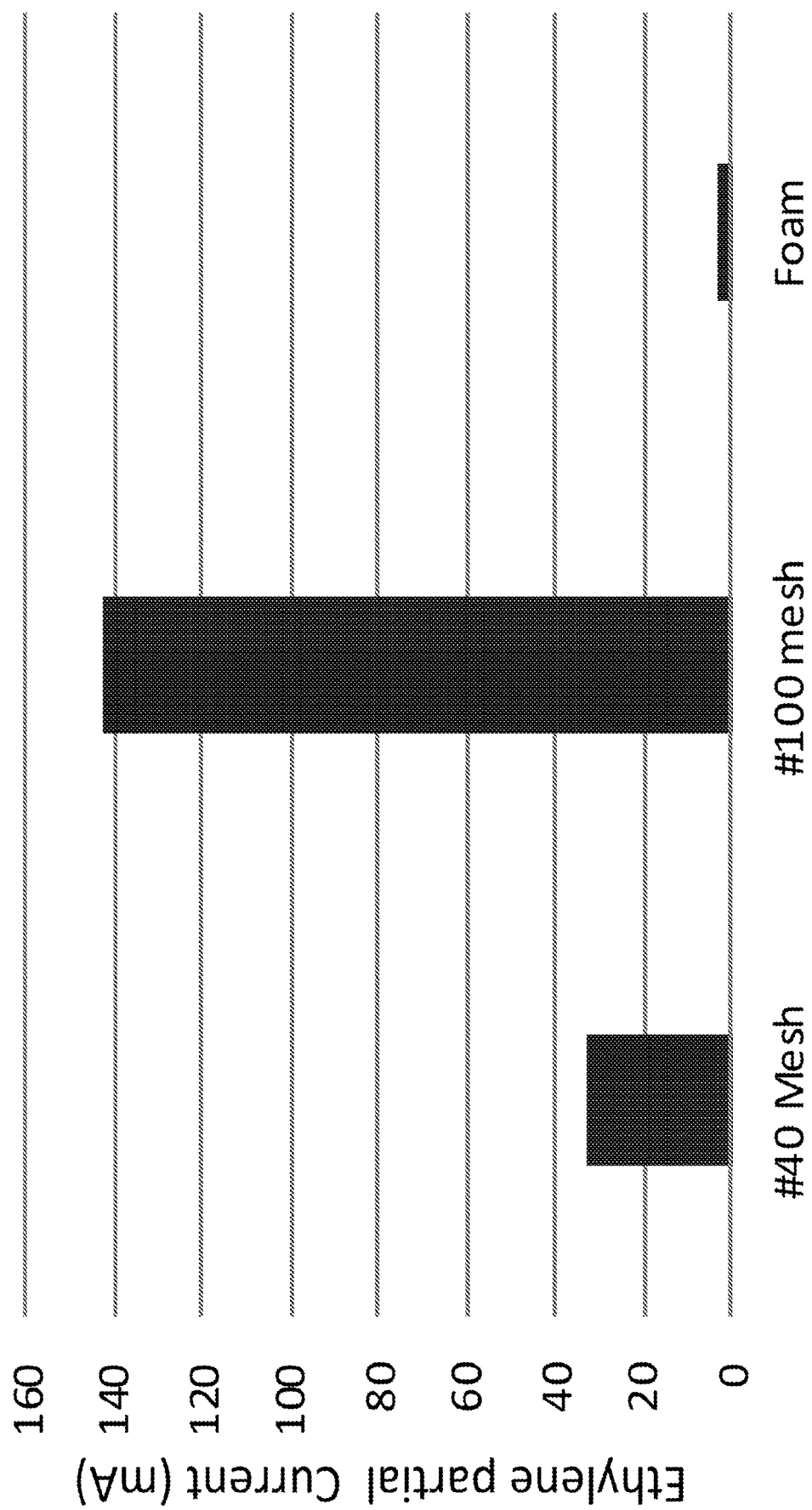
FIG. 17B is a graph showing ethylene partial current for a #40 mesh Cu catalyst, a #100 mess Cu catalyst and a foam Cu catalyst.

A comparison of a foam catalyst, a #100 mesh, and #40 mesh Cu catalyst is shown in FIGS. 17A and 17B. Foam was found to be the lease effective catalyst. It is believed that the pores in foam were too small for the product gas bubbles to readily escape. #100 mesh was found to perform better than the #40 mesh. It is believed that with the #100 mesh, the pores were large enough to allow the gas bubbles to constantly escape and the #100 mesh had a larger exposed surface area as compared to the #40 mesh.

Example 4: Reduction Efficiency

Figure 5A:
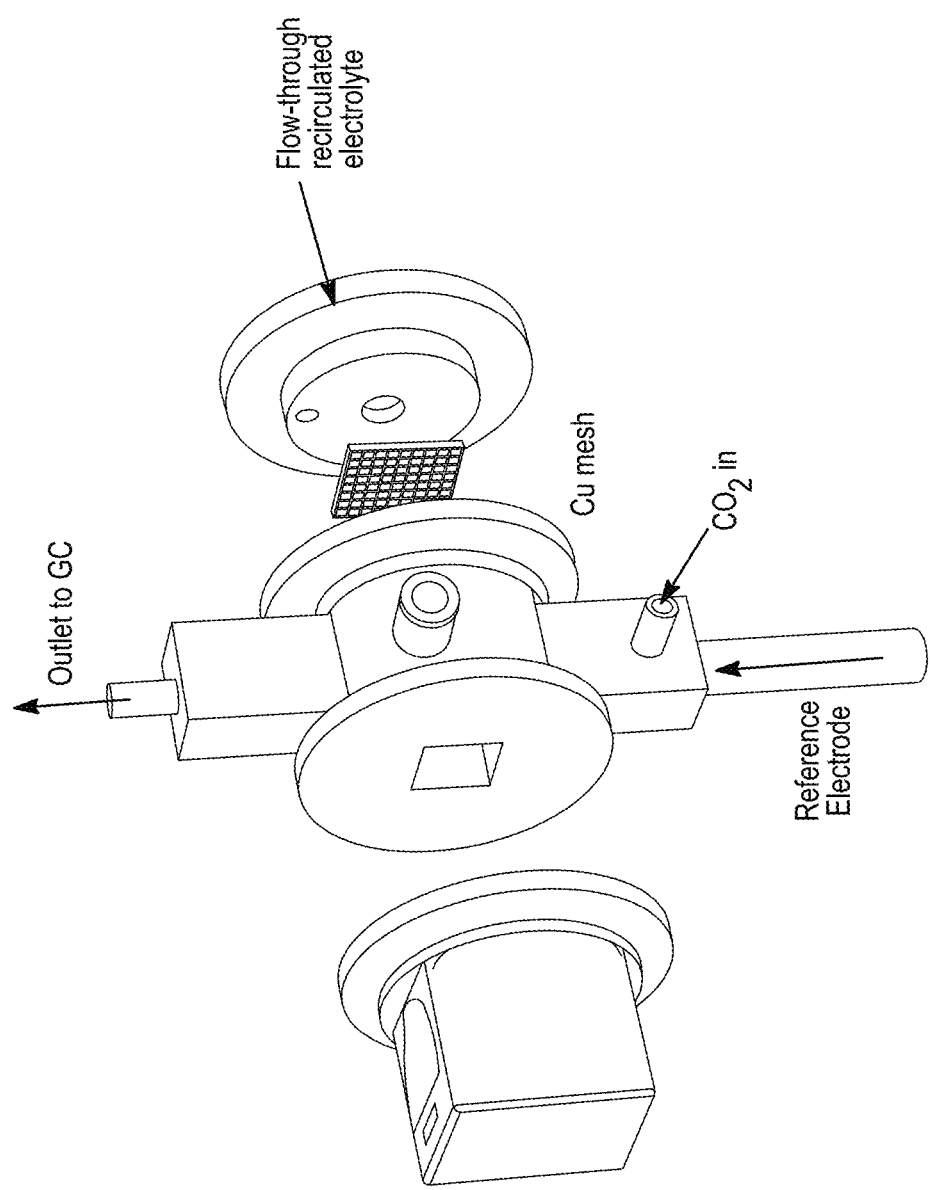
FIG. 5A is a schematic illustration of a reduction unit having Cu mesh catalyst in accordance with the disclosure.

The reduction efficiency of the system was tested using a cell as illustrated in FIG. 5A simulating a reduction unit in accordance with the disclosure. The electrolyte was a combination of KCl and $KHCO_3$ in various volumetric ratios. KCl was observed to act as a supporting electrolyte and helped in achieving higher current densities while $KHCO_3$ facilitated $CO_2$ reduction. The reduction unit included a Cu mesh catalyst. Oscillating potential as described below was adjusted to determine the maximum efficiency of the reduction unit. The reduction unit was operated in flow-through mode with recirculation of the electrolyte and $CO_2$ was flowed into the unit. Referring to FIG. 5D, a high Faradaic efficiency of about 60% was obtained with a partial current of about 10 mA.

Figure 5B:
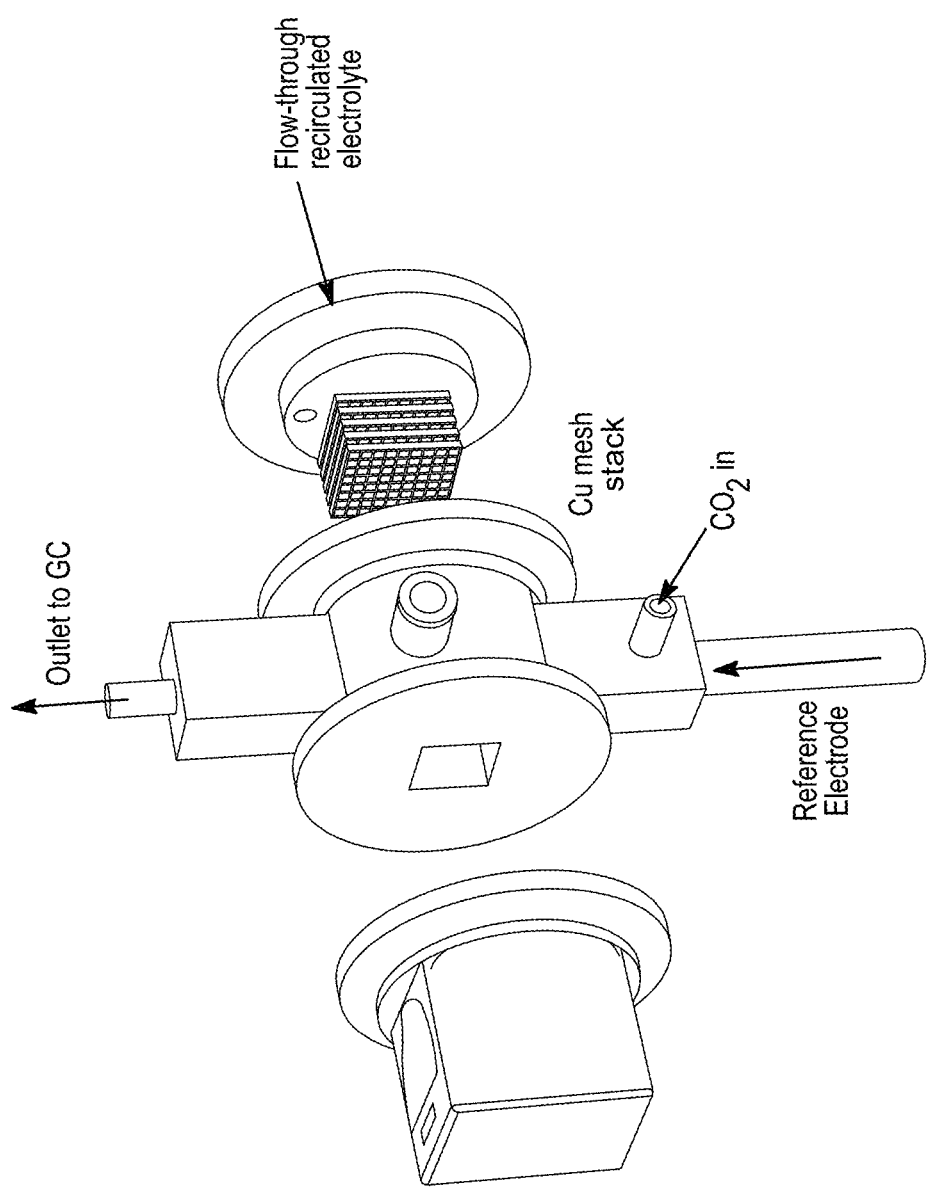
FIG. 5B is a schematic illustration of a reduction unit having a stack of Cu mesh catalyst in accordance with the disclosure.
Figure 5C:
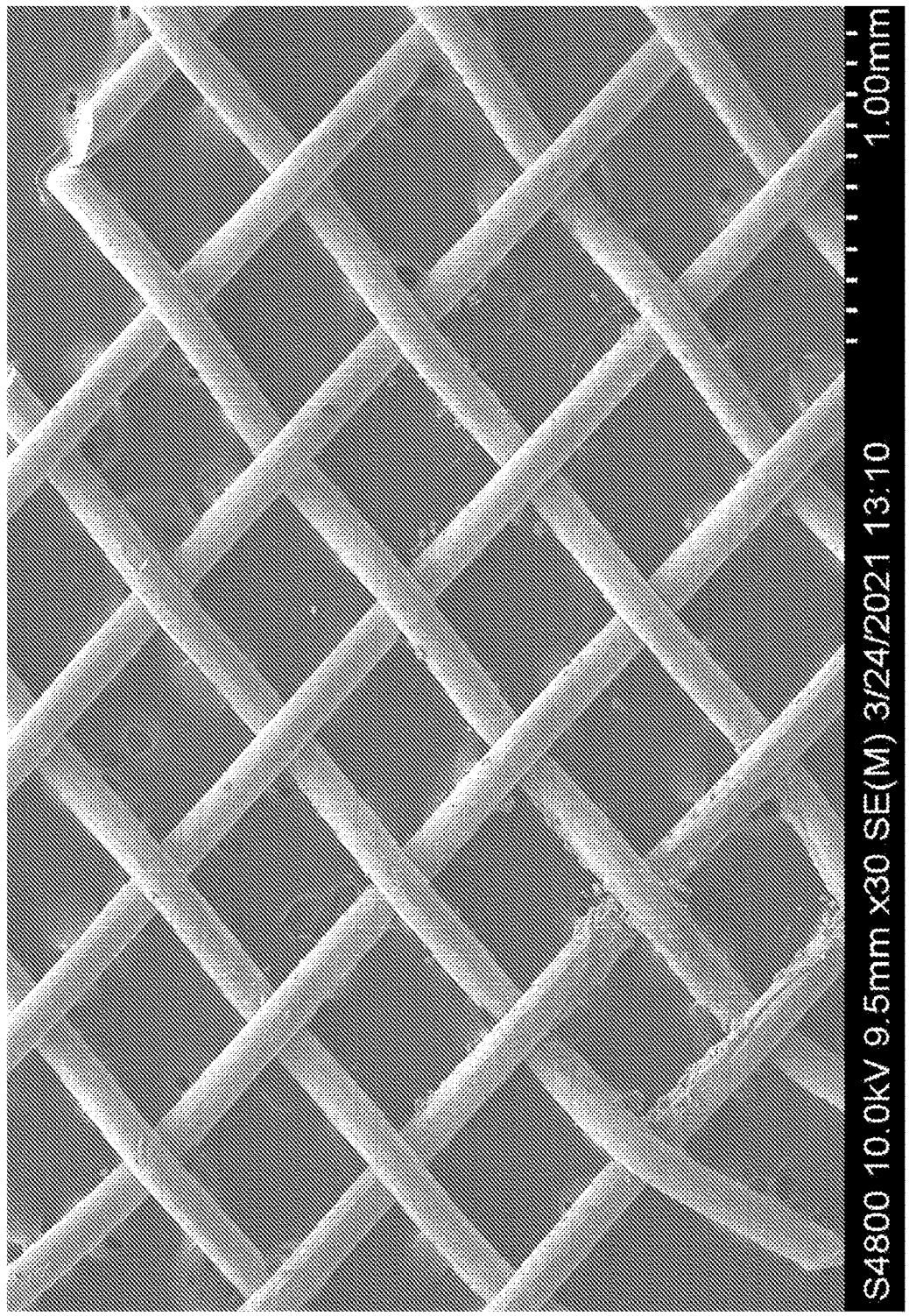
FIG. 5C is a scanning electron microscopy image of a Cu mesh catalyst.
Figure 5D:
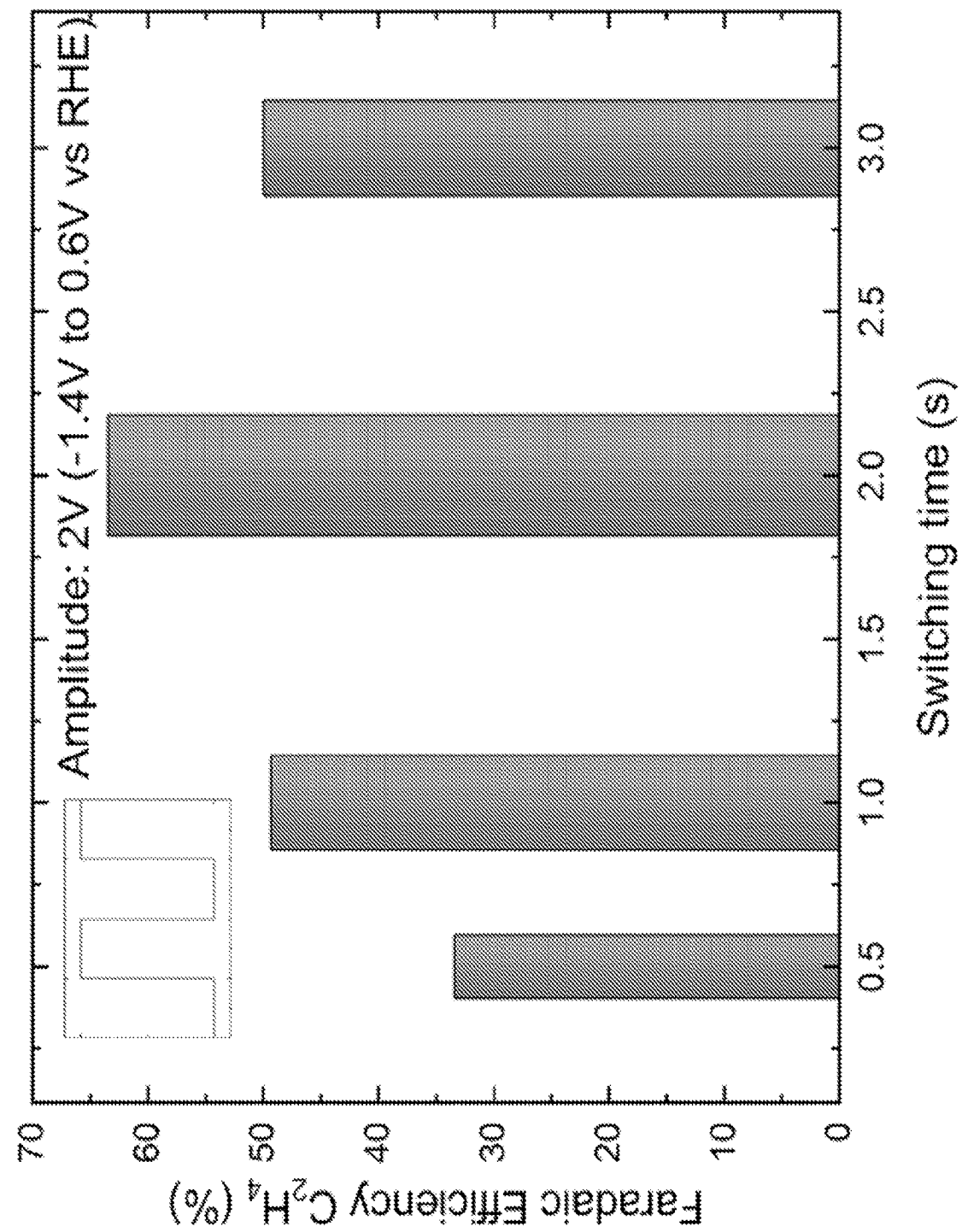
FIG. 5D is a graph illustrating the implementation of an oscillating square wave potential amplitude 2V varying from −1.4 V to 0.6 V verse RHE (inset) showing the Faradaic efficiency of ethylene at different frequency (switching time) of the oscillating square wave potential.
Figure 18:
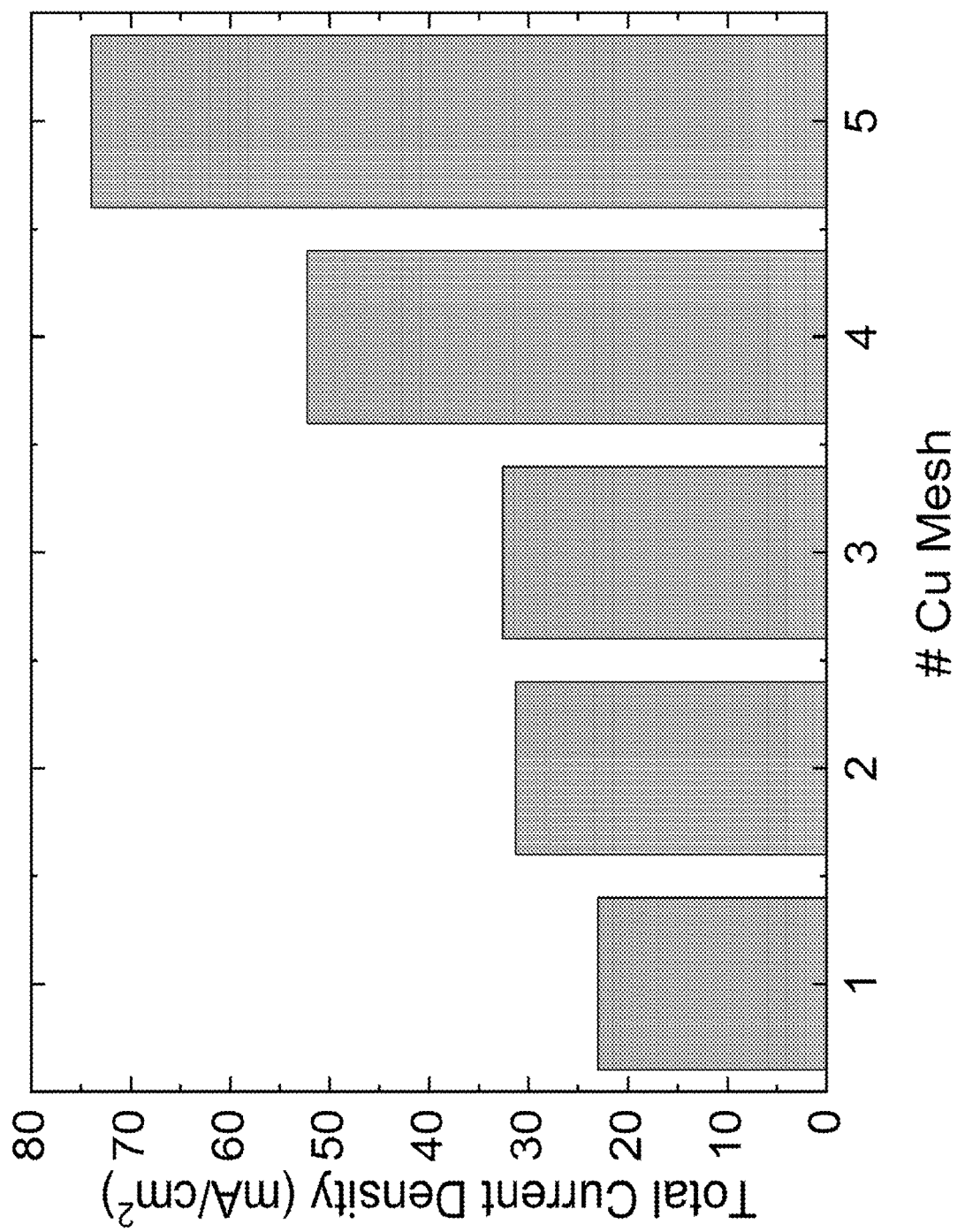
FIG. 18 is a graph showing current density as a function of Cu mesh.
Figure 19:
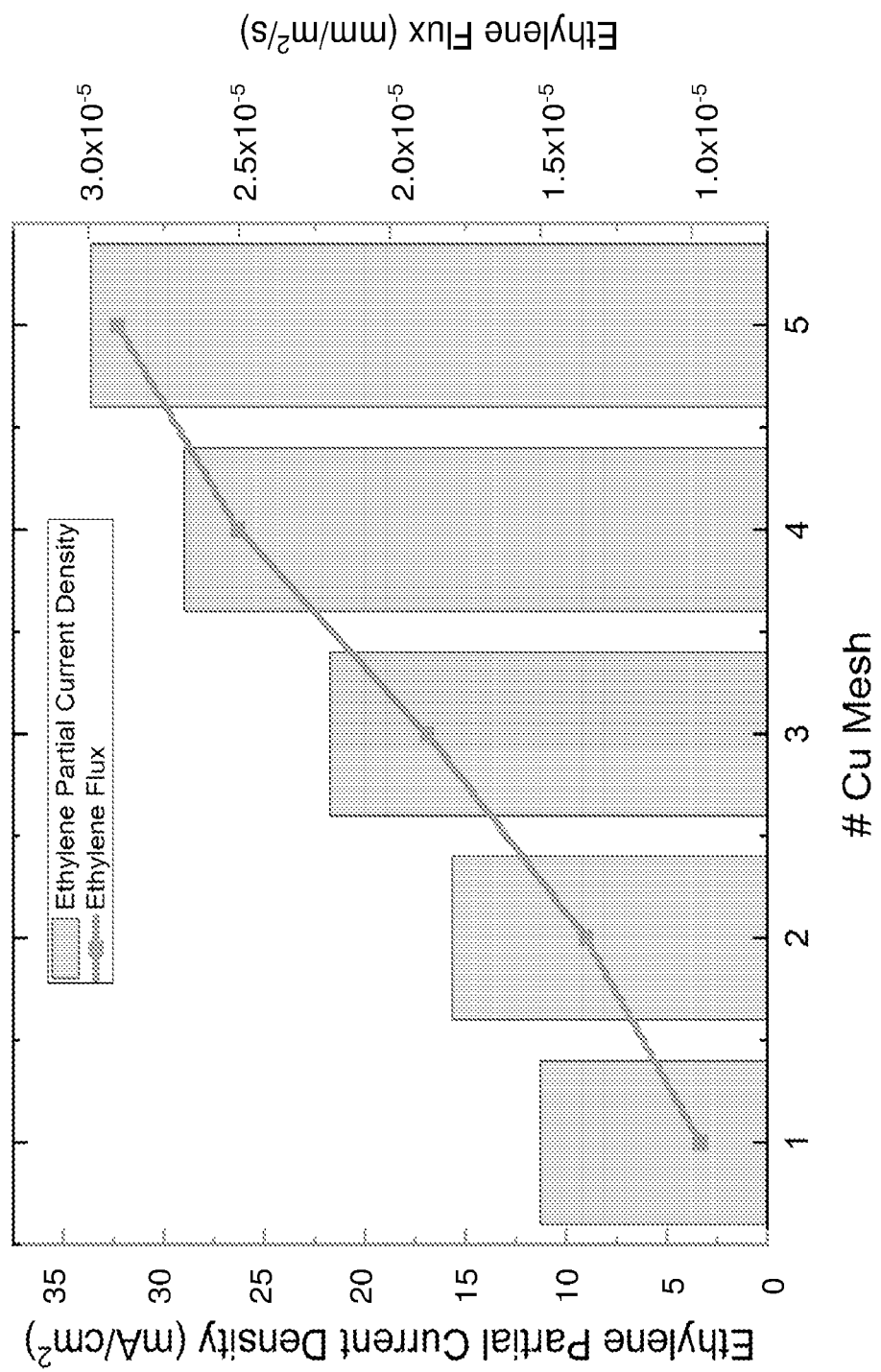
FIG. 19 is a graph showing ethylene partial current as a function of Cu mesh.

Referring to FIGS. 18 and 19, increase in current density was achieved by increasing the number of Cu mesh to provide a stack of Cu mesh as illustrated in reduction unit illustrated in FIG. 5B. The stack of Cu mesh are believed to behave like a porous electrode ensemble.

Figure 20A:
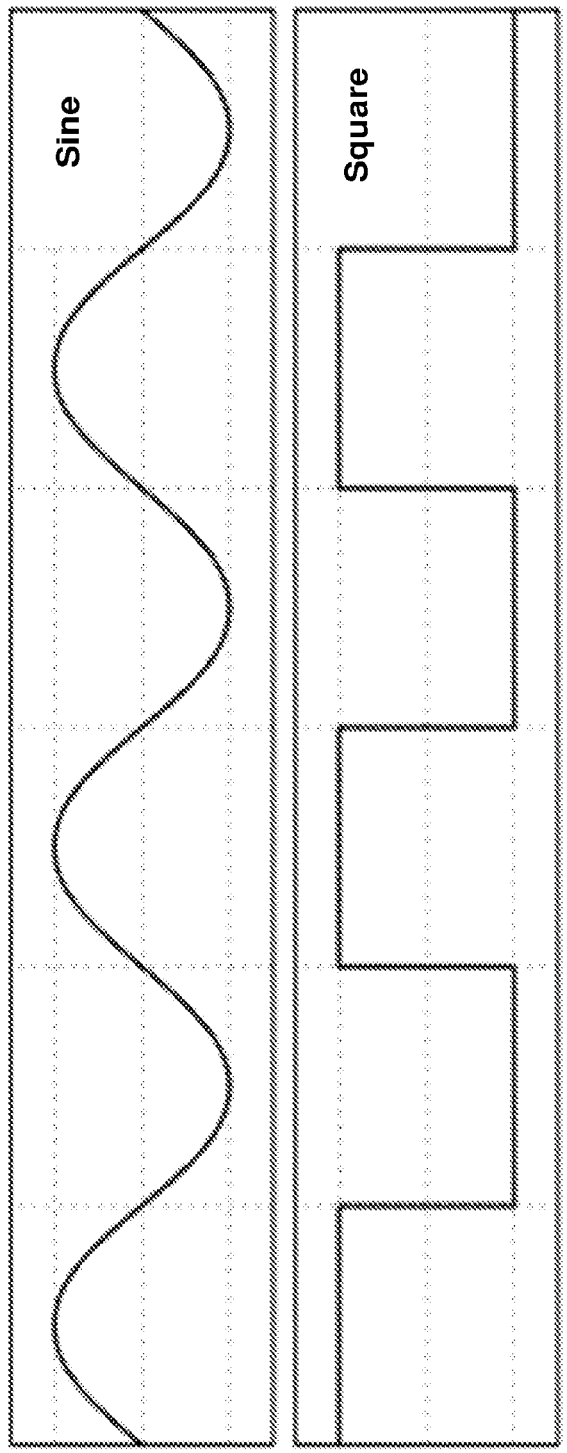
FIG. 20A is a graph showing oscillating wave of sine and square types.
Figure 20B:
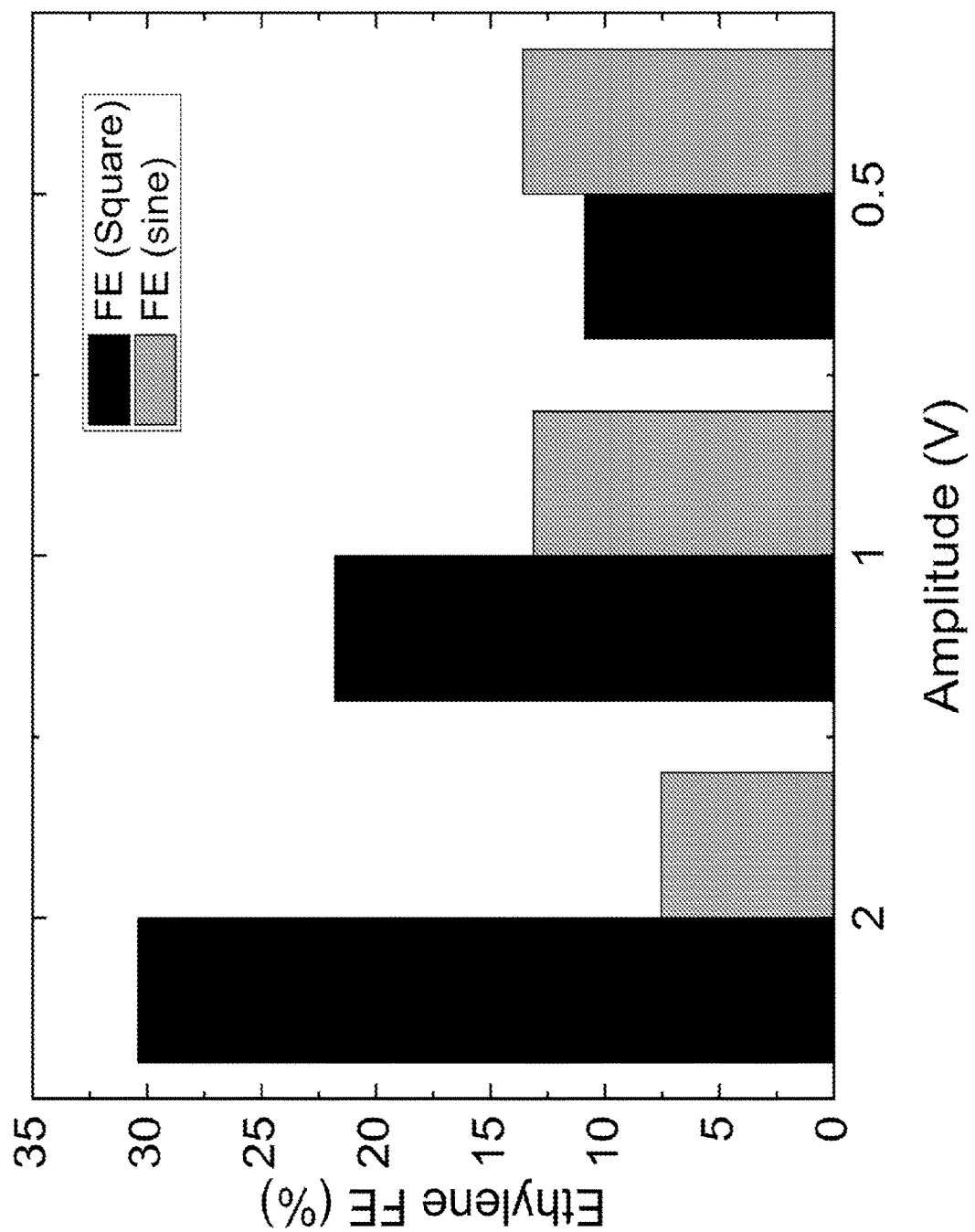
FIG. 20B is a graph showing ethylene FE percentage as a function of amplitude of the oscillating wave.
Figure 20C:
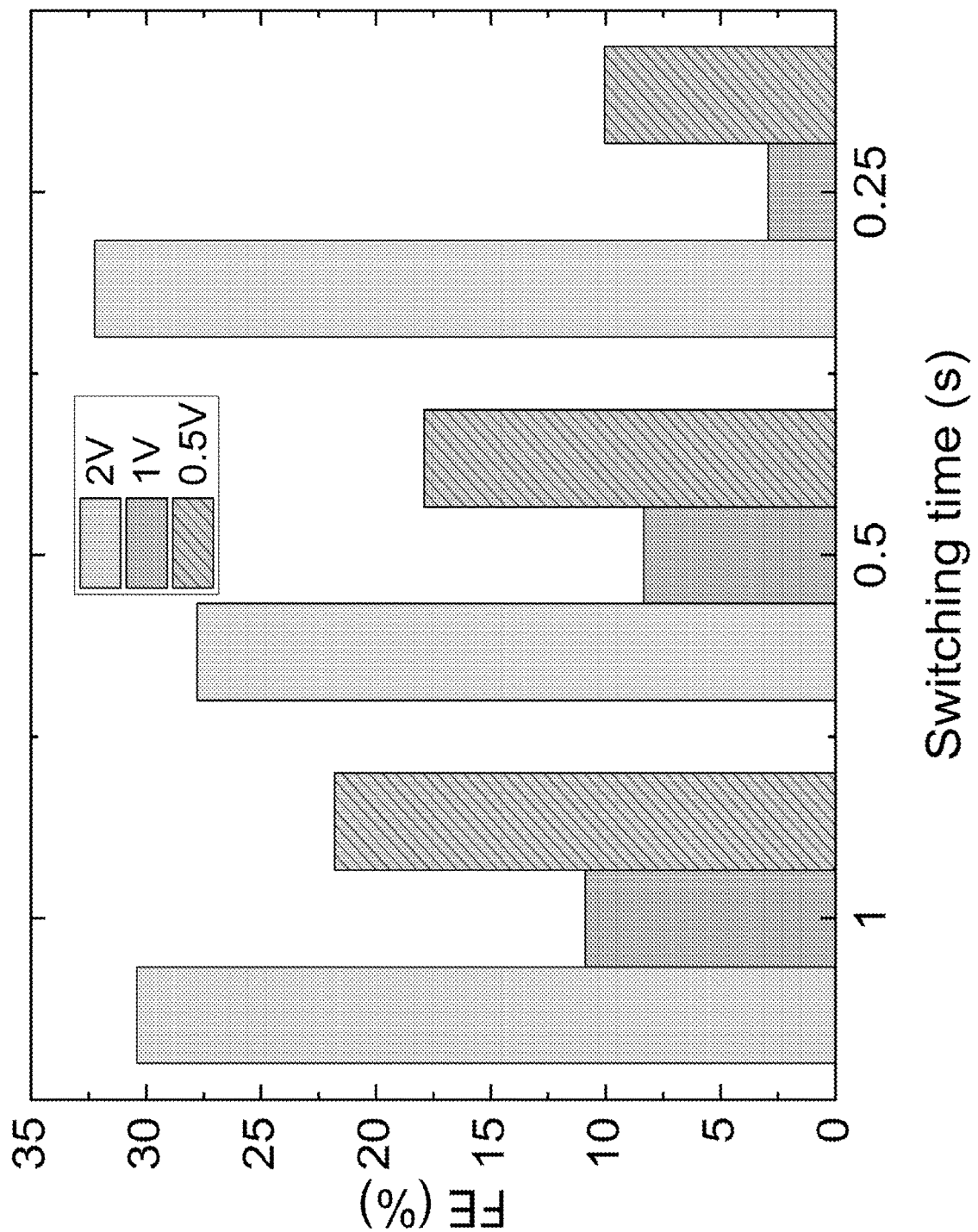
FIG. 20C is a graph showing FE percentage as a function of amplitude of the oscillating wave.

Sine and square wave oscillations (FIG. 20A) were tested for their effectiveness in improving selectivity. Oscillating potentials improve selectivity by reducing the depletion of $CO_2$ concentration at the surface and by taking advantage of Cu(I) reducibility to have control over $C_{2+}$ selectivity. As illustrated in FIGS. 20A and 20B square wave oscillations were more effective.

PROPHETIC EXAMPLES

Prophetic Example 1

The performance curves for direct air capture (DAC) can be measured for state-of-the-art commercial anion exchange membranes (AEMs) (Excellion AEM, Fumatech FAA, Fujifilm, Novasep, Selemion AMV, Membrane International AMI, Tokuyama Neosepta, and Resintech AMB) of different properties, namely, water sorption, water permeability, ion-exchange capacity, ion conductivity, ion selectivity, $CO_2$ diffusivity, porosity, and membrane thickness.

Figure 21:
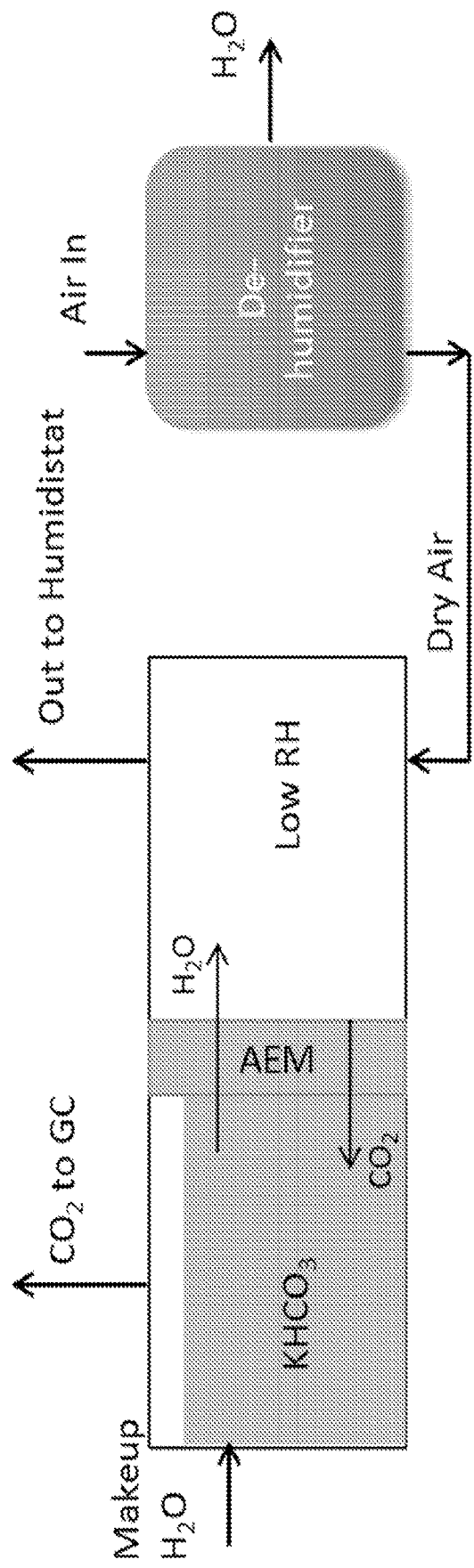
FIG. 21 is an experimental set-up to evaluate carbon capture efficiency of an anionic exchange membrane in the presence of moisture gradients.

The $CO_2$ capture and separation efficiencies can be measured by direct quantification of water flux at the "dry" side and dissolved $CO_2$ concentration at the "wet" side using a suitable experimental setup, such as is shown in FIG. 21, which consists of a liquid chamber (left) and gas chamber (right) separated by AEM. The moisture-gradient in the AEM can be adjusted using a temperature-controlled dehumidifier that controls the RH and temperature of the gas chamber, if desired. The amount of $CO_2$ captured in the electrolyte can be measured by sweeping carrier gas through the electrolyte and quantified using gas chromatography. Alternatively, a calibration curve can be developed between dissolved $CO_2$ and pH, and a pH probe can be used to measure dissolved $CO_2$ concentration indirectly. The $H_2O$ flux into the gas chamber can be measured using humidistat at the outlet. The make-up $H_2O$ can keep the volume of electrolyte constant.

Next, the physical properties of the most promising AEMs can be measured experimentally with higher $CO_2$ separation and capture efficiencies under different operating conditions. $H_2O$ and $CO_2$ absorption isotherms, ion-exchange capacity, the diffusion coefficient of $HCO_3^-$, $H_2O$, and $CO_2$ can be measured using the previously developed diffusion cell setup. More specifically, the ion-exchange capacity of AEM can be measured using potentiometric Mohr titration, where the AEM can be activated, if desired, by first converting into $Cl^-$ form and then immersing in 1M $KNO_3$ solution for 24 hrs, for example. The amount of $Cl^-$ ions exchanged is determined by potentiometric titration with $AgNO_3$. The $H_2O$ uptake/sorption isotherms can be determined using gravimetric analysis, where AEM can be first exchanged into $HCO_3^-$ form followed by its equilibration in a humidity-controlled chamber for 24 hrs.

The conductivity of $HCO_3^-$ form of AEM can be measured using two-probe in-plane impedance spectroscopy in a humidity-controlled chamber. To measure $CO_2$ sorption and diffusion coefficient, chronoamperometry can be performed in a diffusion cell with a suitable electrode on the downstream face of the AEM, that can register a reduction current after $CO_2$ is introduced into the upstream side and diffuses through the AEM. The transient current density data can be fitted to an analytical solution of Fick's second law of diffusion to obtain the $CO_2$ sorption and diffusion coefficient. The diffusion coefficients and isotherms can be measured for different RH and temperature.

In accordance with the principles herein, the AEMs with lower $CO_2$ diffusion coefficients can have higher $CO_2$ separation efficiency, higher $HCO_3^-$ diffusion coefficient can support higher $CO_2$ capture efficiency, and lower $H_2O$ permeability can reduce the energy required to dehumidify the air. The measured physical properties and performance metrics can be related to obtain property-performance relationships for DAC.

Next, COMSOL simulations can be performed using these measured physical properties to identify optimal operating conditions such as temperature, ionic strength of electrolyte, RH, air composition, air flow rate, electrolyte flow rate, $CO_2$ pressure, and $H_2O$ flux to maximize the $CO_2$ separation and capture efficiencies. In other words, simulations can be used to identify optimal operating conditions, to elucidate the mechanism of $CO_2$ capture and transport, and to provide a diagnosis to improve $CO_2$ separation and capture efficiencies based on a particular system. For instance, such a diagnosis will identify whether higher back-diffusion of $CO_2$, higher $H_2O$ flux, or lower $HCO_3^-$ flux is limiting $CO_2$ capture and separation efficiencies. The COMSOL simulations can solve the mass, charge, energy, and momentum balance equations, where the transport of species can be described using Nernst-Planck equations, ionic equilibrium will be modeled using acid-base reactions, the partition of $H_2O$ and $CO_2$ at the "dry" and "wet" interfaces can be defined using water sorption and $CO_2$ absorption isotherms, Donan equilibrium of ions can be applied at "wet" interface, and water-dependent $CO_2$ capture and release reactions can be implemented at the "dry" and "wet" interfaces.

The optimal operating conditions obtained from these simulations can guide the development of the $CO_2$ capture process systems, devices, units, and processes based on the air quality and temperature of different geographic locations so that the captured $CO_2$ rate matches with optimal $CO_2$ conversion rates. If the physical properties of promising AEMs are not favoring the target $CO_2$ capture rates, the $H_2O$ sorption and permeability and $CO_2$ diffusion coefficient can be modified by thermal annealing to improve $CO_2$ capture performance. Thermal annealing is a facile route for tuning the morphology and crystallinity of polymer membranes and can be used to decrease gas and $H_2O$ permeability. An increase in the crystallinity of the matrix can lead to a lower $CO_2$ solubility as gases are much more soluble in amorphous domains. Moreover, the larger crystallites can act as barriers and increase the tortuosity of the diffusion path for gas and $H_2O$ molecules. The thermal annealing of the AEMs can be conducted in a suitable environment, such as a vacuum oven at specific temperatures (160-200° C.) for a suitable time, such as 24 hrs, followed by soaking in a suitable solution, such as 1M KOH electrolyte, before using in the diffusion cell. An intermediate temperature (~160° C.) can favor a reduction in $CO_2$ permeability, as the exceedingly high temperatures can reduce the crystallinity of the AEM, which is required for lower $CO_2$ permeability. Additionally, the higher performance of $CO_2$ capture can be attained by increasing membrane interfacial area using either a hollow-fiber module or porous carbon substrates.

Prophetic Example 2

In accordance with the principles herein, a full-scale electrochemical model can be configured in COMSOL to inform the design for the integrated $CO_2$ capture and conversion systems. The simulations can optimize the geometry and operating conditions of a prototype to achieve maximum $CO_2$ utilization rates with minimum power consumption. The COMSOL simulation for the electrochemical cell described by Singh et al. in "Effects of temperature and gas-liquid mass transfer on the operation of small electrochemical cells for the quantitative evaluation of $CO_2$ reduction electrocatalysts" can be used to calculate polarization losses, species distribution, and power efficiency in the fully integrated system. This COMSOL simulation can calculate voltage losses in the catalyst layers, electrolyte, and membrane separators, which depends on the: (i) kinetic overpotential of the electrocatalysts, (ii) conductivity and transference number of electrolyte and membrane, (iii) operating conditions such as $CO_2$ flowrate, partial pressure, and temperature, and (iv) physical dimensions of the components. The COMSOL simulations can solve the mass, charge, energy, and momentum balance equations, where the transport of species can be described using Nernst-Planck equations, ionic equilibrium in the electrolyte can be modeled using acid-base reactions, oxygen evolution reaction (OER) and $CO_2$ reduction reaction ($CO_2$RR) reactions can be described using Butler-Volmer expression, mixing pattern in the electrolyte can be described by Navier Stokes equation, and the $CO_2$ capture and separation can be modeled as described below. The total cell voltage can be expressed as a sum of the equilibrium potentials $E^0$ and kinetic over-potentials $r_i$ for the OER and CO$_2$RR, the solution losses $\Delta\phi_{solution}$ in the electrolyte and membrane, and the Nernstian losses $\Delta\phi_{Nernstian}$ at the electrodes, and is given by $$V(J)=E_{OER}^0-E_{CO_2RR}^0+\eta_{OER}(J)-\eta_{CO_2RR}(J)+\Delta\phi_{solution}(J)+\Delta\phi_{Nernestian}(J)$$

The cell voltage and operating current density can be computed in COMSOL for the prototype configuration consisting of a suitable catalyst cathode, IrO$_2$ anode, 0.1-1M KOH/choline chloride hybrid electrolyte, 2-10 mm spacing between membrane and electrode, 0.01-0.1 mm thickness of boundary layer, and 5-100 sccm air flowrate at ambient conditions. The optimal geometry and operational conditions can be determined and can be used for the design and manufacturing of the integrated system.

Printing, Assembly of an Integrated System, and Performance Evaluation

Figure 8:
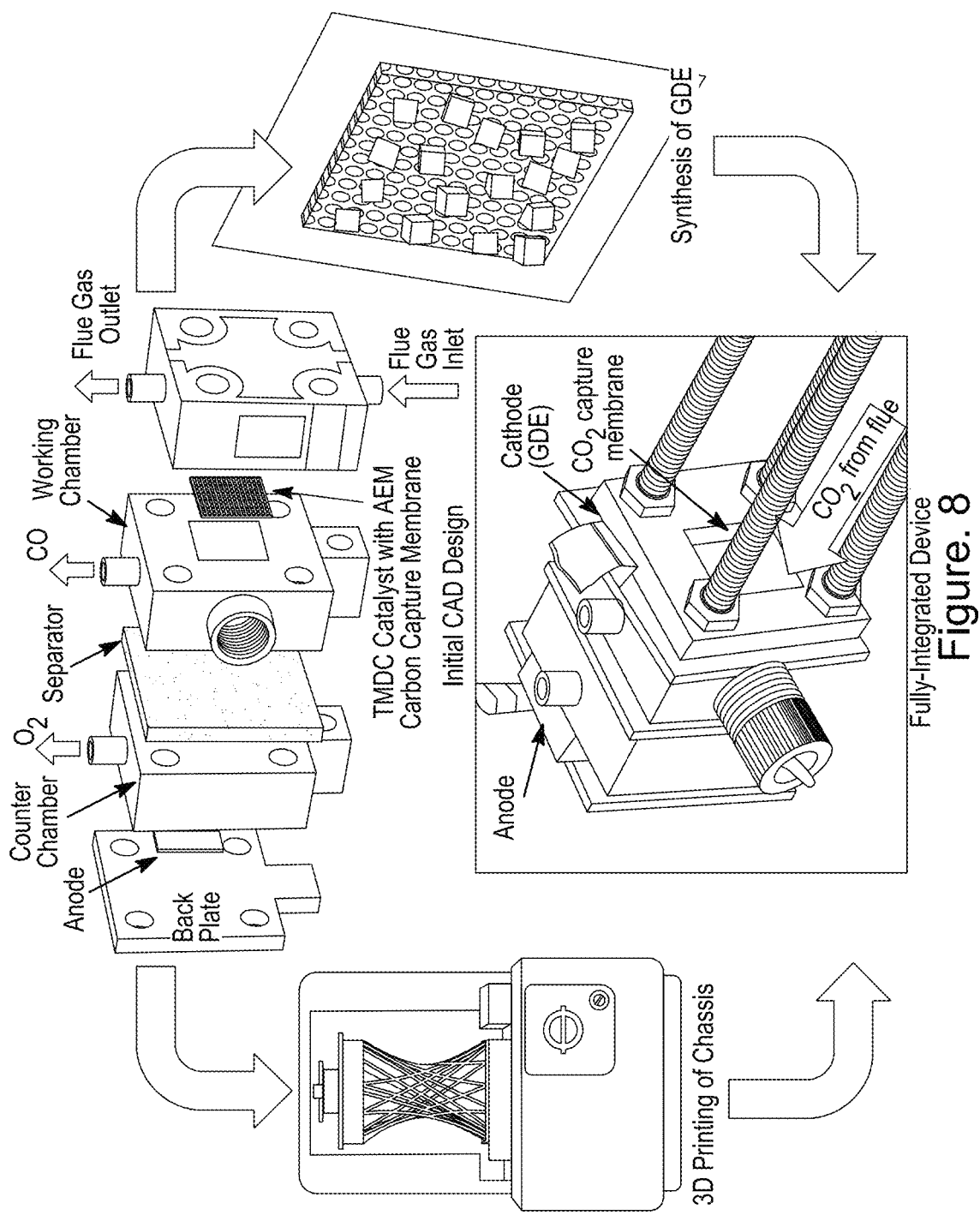
FIG. 8 is a schematic illustration of a system in accordance with the disclosure.

FIG. 8 (top) shows the initial CAD design of an exemplary electrochemical cell, where the CO$_2$ capture unit can be integrated with an anion exchange membrane serving as a catalyst-based gas diffusion electrode (GDE). The chassis can be designed in SolidWorks® and 3D printed using a Form 2 SLA 3D printer, if desired. The Form 2 printer can utilize Clear FLGPCL04 resin activated by 405 nm laser to print optically clear parts with 150 μm of lateral and 25 μm of axial resolutions. The resin can be chemically resistant to a wide range of solvents and pH ranges.

The post-washed 3D printed parts can be finished by removing supports and then curing for 20 minutes under a commercial ultraviolet lamp. The assembled device is shown in FIG. 5 (bottom). The GDE can be fabricated by spray coating of an ink comprised of catalyst, carbon particles (for enhanced electrical conductivity), and AEM ionomer (for carbon capture) on one side of porous carbon paper (substrate and current collector). The other side of carbon paper can be coated with only AEM ionomers, if desired.

The AEM-coated-side of carbon paper can capture CO$_2$, and the other side can convert the CO$_2$ to CO, or other output. The effect of the interaction between AEM ionomer and the catalyst on the activity and selectivity can also be evaluated using a flow cell setup. Alternatively, an electrospinning method can be used to fabricate the GDE electrode with the same configuration and ink composition to enhance its stability for long-term use. The relative concentration/area of AEM ionomer and a catalyst can be adjusted to match the rate of CO$_2$ capture with the conversion rate.

In systems of the disclosure improved conversion efficiencies can be obtained by utilizing a reduction catalyst can be separated from the CO$_2$ capture AEM using a zero-gap electrolyzer configuration. In this configuration, the AEM ionomer coated on the hollow-fiber module can be placed near the catalyst, such that CO$_2$ can be captured using the hollow-fiber module and transferred to the electrolyte in the zero-gap (<1 mm space), and can then be convert dissolved CO$_2$ to syngas.

Chronoamperometry experiments at different applied potentials can be performed on the fully automated integrated device to measure CO and H$_2$ production (using gas chromatography) over time to assess the effectiveness of CO$_2$ capture and conversion. The limiting factors such as degradation of AEM, aggregation of catalysts, or salt formation on AEM that determines the stability and lifetime of the device can be identified experimentally and diagnosed using the full-scale electrochemical model. Moreover, after optimizing the operational conditions, the long-term performance (from at least 100 to more than 500 hours) of the integrated system can be studied in a fully automated system.

The pH of the electrolyte can be varied in these chronoamperometric experiments to influence the selectivity of CO$_2$ reduction products to make it more selective towards other value-added products such as CH$_4$, HCOOH, C$_2$H$_5$OH and the like.

In accordance with the principles herein, counter-diffusion of H$_2$O and HCO$_3^-$ in various anion exchange membranes (AEMs) can be customized to develop property-performance relationships for CO$_2$ capture from the air, reveal mechanistic insights into CO$_2$ transport and conversion in integrated systems, and examine the effect of ionomer-catalyst interactions on CO$_2$ conversion, develop stand-alone and modular devices and systems that can absorb CO$_2$ from the air, release O$_2$ and H$_2$O, and produce syngas or other products for industrial use.

The technical information set out herein may in some respects go beyond the disclosure of the invention, which is defined exclusively by the appended claims. The additional technical information is provided to place the actual invention in a broader technical context and to illustrate possible related technical developments. Such additional technical information which does not fall within the scope of the appended claims, is not part of the invention.

While particular embodiments of the present invention have been shown and described in detail, it will be obvious to those skilled in the art that changes and modifications may be made without departing from the invention in its broader aspects. Therefore, the aim is to cover all such changes and modifications as fall within the true spirit and scope of the invention. The matters set forth in the foregoing description and accompanying drawings are offered by way of illustration only and not as limitations. The actual scope of the invention is to be defined by the subsequent claims when viewed in their proper perspective based on the prior art.

What is claimed:

1. An active CO$_2$ capture unit for capturing CO$_2$ from an input gas, comprising:
    an inlet through which an input gas is introduced into the unit;
    a non-aqueous region into which the input gas is introduced,
    a cathode arranged upstream of the non-aqueous region and in fluid communication with an H$_2$O source and in fluid communication with the non-aqueous region, such that the cathode is configured to decompose H$_2$O received from the H$_2$O source into H$_2$ and OH$^-$ and the OH$^-$ is flowed to the non-aqueous region, wherein in the non-aqueous region OH$^-$ interacts with the input gas to chemisorb CO$_2$ from the input gas and convert the chemisorbed CO$_2$ into HCO$_3^-$ by reacting with OH$^-$;
    an aqueous region comprising a humidified gas arranged downstream of the non-aqueous region, wherein at an aqueous region interface, the HCO$_3^-$ interacts with H$_2$O and decomposes to CO$_2$ and CO$_3^{2-}$;
    an anion exchange membrane disposed between the non-aqueous region and the aqueous region, the anionic exchange membrane having a gradient of moisture to facilitate HCO$_3^-$ diffusion and migration from the non-aqueous region to the aqueous region;
    an anode arranged downstream of the aqueous region; and
    a captured CO$_2$ outlet disposed downstream of the aqueous region.

2. The active $CO_2$ capture unit of claim 1, further comprising an $H_2$ outlet configured to allow for flow of $H_2$ generated at the cathode during decomposition of the $H_2O$ away from the cathode.

3. The active $CO_2$ capture unit of claim 1, wherein the anode is a planar and/or porous anode.

4. The active $CO_2$ capture unit of claim 3, wherein the cathode is a porous cathode.

5. The active $CO_2$ capture unit of claim 3, wherein the anode is a porous anode.

6. The active $CO_2$ capture unit of claim 1, wherein the input gas is an anthropogenic $CO_2$ source.

7. The active $CO_2$ capture unit of claim 6, wherein the anthropogenic $CO_2$ source is air or flue gas.

8. The active $CO_2$ capture unit of claim 1, wherein the anion exchange membrane comprises a hollow-fiber structure.

9. The active $CO_2$ capture unit of claim 1, wherein the anionic exchange membrane comprises quaternary amines or phosphonium attached to a polymer backbone resin with hydroxide, carbonate, and/or bicarbonate moieties.

10. The active $CO_2$ capture unit of claim 9, wherein the polymer backbone is polystyrene.

11. A system for active $CO_2$ capture and $CO_2$ reduction to a product gas, comprising:
the active $CO_2$ capture unit of claim 1;
a reduction unit arranged downstream of the active $CO_2$ capture unit such that the reduction unit receives captured $CO_2$ from the $CO_2$ capture outlet, the reduction unit comprising:
a reduction unit inlet for receiving the captured $CO_2$ from the $CO_2$ capture outlet, the reduction unit comprising a catalyst for reduction of the captured $CO_2$ arranged such that the captured $CO_2$ is flowed through the reduction unit into contact with the catalyst, wherein upon contact with the catalyst, the captured $CO_2$ is reduced to a product gas comprising one or more of $C_2H_4$, $C_2H_5OH$, $CH_3COOH$, $CH_3OH$, $CH_4$, $C_3H_6$, CO, and $H_2$;
a catalyst for oxidation of $H_2O$ arranged downstream of the reduction unit and in fluid communication with the reduction unit to generate protons for $CO_2$ reduction and $O_2$ as a byproduct, wherein the catalyst for oxidation is an anode;
a separator arranged between the catalyst for reduction and the catalyst for oxidation; and
an energy source.

12. The system of claim 11, wherein the catalyst for reduction is a copper mesh.

13. The system of claim 12, wherein the copper mesh has a mesh size of about 40 to about 120 mesh.

14. The system of claim 11, wherein the catalyst comprises metal nanocrystals.

15. The system of claim 14, wherein the metal nanocrystals comprise Cu nanocrystals.

16. The system of claim 15, wherein the Cu nanocrystals are Cu nanocubes having dominate (100) facets.

17. The system of claim 14, wherein the metal nanocrystals are grown on a mesh substrate.

18. The system of claim 11, wherein the catalyst for oxidation comprises one or more oxides of Ni, Fe—Ni, Pt-coated Ti, Ir, and Ru.

19. The system of claim 11, wherein the active $CO_2$ capture unit and the reduction unit is spaced a distance of about 5 mm to about 20 mm.

20. The system of claim 11, wherein the energy source comprises a photocell and/or electrochemical cell.

21. The system of claim 11, further comprising an outlet for the $O_2$ byproduct arranged spatially separated from an outlet for the product gas.

22. A method for capturing $CO_2$ and reducing $CO_2$ to a product gas comprising one or more of $C_3H_6$, $C_2H_4$, $C_2H_5OH$, $CH_3COOH$, $CH_3OH$, $CH_4$, CO, and $H_2$ using the system of claim 11, comprising:
flowing the input gas into the inlet and into the non-aqueous region for chemisorbing $CO_2$ and conversion of the $CO_2$ to $HCO_3^-$ by $OH^-$ present in the non-aqueous region;
flowing the $HCO_3^-$ across the anionic exchange membrane and into the aqueous region, wherein the flow of $HCO_3^-$ is driven at least in part by a gradient of moisture across the anionic exchange membrane, wherein upon flow in the $HCO_3^-$ into the aqueous region, the $HCO_3^-$ interacts with $H_2O$ present in the aqueous region and decomposes to $CO_2$ and $CO_3^{2-}$ thereby resulting in captured $CO_2$;
flowing the captured $CO_2$ from the aqueous region to the capture $CO_2$ outlet;
flowing the captured $CO_2$ from the capture $CO_2$ outlet into the reduction unit, wherein upon contact with the catalyst the captured $CO_2$ is reduced to the product gas comprising one or more of $C_3H_6$, $C_2H_4$, $C_2H_5OH$, $CH_3COOH$, $CH_3OH$, $CH_4$, CO, and $H_2$; and
flowing the product gas to a reduction unit outlet.

23. The method of claim 22, wherein the input gas has a temperature of about 20 to 120° C.

* * * * *